(12) United States Patent
Stahlberg et al.

(10) Patent No.: US 12,393,795 B2
(45) Date of Patent: Aug. 19, 2025

(54) MODELING AMBIGUITY IN NEURAL MACHINE TRANSLATION

(71) Applicant: Google LLC, Mountain View, CA (US)

(72) Inventors: Felix Stahlberg, Berlin (DE); Shankar Kumar, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 289 days.

(21) Appl. No.: 18/089,684

(22) Filed: Dec. 28, 2022

(65) Prior Publication Data

US 2023/0351125 A1 Nov. 2, 2023

Related U.S. Application Data

(63) Continuation of application No. PCT/US2022/026683, filed on Apr. 28, 2022.

(51) Int. Cl.
| | |
|---|---|
| *G06F 40/40* | (2020.01) |
| *G06F 40/284* | (2020.01) |
| *G06F 40/45* | (2020.01) |
| *G06F 40/58* | (2020.01) |
| *G06N 3/0455* | (2023.01) |

(52) U.S. Cl.
CPC ............ *G06F 40/58* (2020.01); *G06F 40/284* (2020.01)

(58) Field of Classification Search
CPC .......... G06F 40/40; G06F 40/45; G06F 40/47; G06F 40/58; G06N 3/04; G06N 3/048; G06N 3/0455
USPC ........................... 704/2, 4, 5; 706/12, 15, 27
See application file for complete search history.

(56) References Cited

U.S. PATENT DOCUMENTS 10,346,548 B1 * 7/2019 Wuebker ................. G06F 40/58
10,452,978 B2 * 10/2019 Shazeer ................. G06N 20/00
(Continued)

OTHER PUBLICATIONS

Stahlberg and Kumar, "Jam or Cream First? Modeling Ambiguity in Neural Network Translation with SCONES", Proceedings of the 2022 Conference of the North American Chapter of the Association for Computational Linguistics: Human Language Technologies, May 2, 2022, 12 Pages. (Year: 2022).*

(Continued)

*Primary Examiner* — Martin Lerner
(74) *Attorney, Agent, or Firm* — Gray Ice Higdon

(57) ABSTRACT

The technology addresses ambiguity in neural machine translation. An encoder module receives a given text exemplar and generates an encoded representation of it. A decoder module receives the encoded representation and a set of translation prefixes. The decoder module outputs an unbounded function corresponding to a set of tokens associated with each pair of the given text exemplar and translation prefix from the set of translation prefixes. Each token is assigned a probability between 0 and 1 in a vocabulary of the exemplar at each time step. A logits module generates, based on the unbounded function, a corresponding bounded conditional probability for each token, wherein the probabilities are not normalized over the vocabulary at each time step. A loss function module having a positive loss component and a scaled negative loss component identifies whether each target text of a set of target texts is a valid translation of the exemplar.

21 Claims, 23 Drawing Sheets

(56) References Cited

U.S. PATENT DOCUMENTS

| | | | | |
|---|---|---|---|---|
| 2008/0162111 | A1* | 7/2008 | Bangalore | G06F 40/44 704/9 |
| 2011/0282643 | A1* | 11/2011 | Chatterjee | G06F 40/44 704/2 |
| 2014/0019113 | A1* | 1/2014 | Wu | G06F 40/45 704/2 |
| 2014/0288914 | A1* | 9/2014 | Shen | G06F 40/47 704/2 |
| 2019/0129947 | A1* | 5/2019 | Shin | G06F 40/58 |
| 2020/0034436 | A1 | 1/2020 | Chen et al. | |
| 2020/0104371 | A1* | 4/2020 | Ma | G06F 40/58 |
| 2020/0117715 | A1* | 4/2020 | Lee | G06F 40/51 |
| 2020/0184020 | A1 | 6/2020 | Hashimoto et al. | |
| 2021/0103704 | A1* | 4/2021 | Li | G06F 40/58 |
| 2021/0286955 | A1* | 9/2021 | Scharnbacher | G06F 40/58 |
| 2021/0390269 | A1* | 12/2021 | Rezagholizadeh | G06F 40/58 |
| 2022/0147721 | A1* | 5/2022 | Galle | G06F 40/44 |
| 2022/0366152 | A1* | 11/2022 | Zenkel | G06F 40/58 |
| 2023/0169281 | A1* | 6/2023 | Zheng | G06F 40/44 704/2 |
| 2023/0267285 | A1* | 8/2023 | Wu | G06F 40/58 704/2 |

OTHER PUBLICATIONS

Ro et al., "Transformer-based Models of Text Normalization for Speech Applications", arXiv:2202.00153v1, Feb. 1, 2022, 5 Pages. (Year: 2022).*

Sia et al., "Prefix Embeddings for In-context Machine Translation", Proceedings of the 15th Biennial Conference of the Association for Machine Translation in the Americas (vol. 1: Research Track), Sep. 2022, pp. 45-57. (Year: 2022).*

Stahlberg et al., "Seq2Edits: Sequence Transduction Using Span-level Edit Operations", Proceedings of the 2020 Conference on Empirical Methods in Natural Language Processing, Nov. 16-20, 2020, pp. 5147-5159. (Year: 2020).*

Kano et al., "Simultaneous Neural Machine Translation with Prefix Alignment", Proceedings of the 19th International Conference on Spoken Language Translation (IWSLT 2022), May 26-27, 2022, pp. 22-31. (Year: 2022).*

International Search Report and Written Opinion for Application No. PCT/US2022/026683 dated Dec. 1, 2022 (11 pages).

Bradbury, et al., "Composable transformations of Python+NumPy programs: differentiate, vectorize, JIT to GPU/TPU, and more", 2018, https://github.com/jax-ml/jax?tab=readme-ov-file#readme, downloaded from internet on Feb. 27, 2025, 8 pages.

Brown, Peter F., et al., "The Mathematics of Statistical Machine Translation: Parameter Estimation", IBM T.J. Watson Research Center, Yorktown Heights, NY 10598, Computational Linguistics, vol. 19, No. 2, 1993, pp. 263-311.

Gao, Qin, et al., "Parallel Implementations of Word Alignment Tool", Software Engineering, Testing, and Quality Assurance for Natural Language Processing, pp. 49-57, Columbus, Ohio, USA, Jun. 2008.

Gutmann, Michael, et al., "Noise-contrastive estimation: A new estimation principle for unnormalized statistical models", Appearing in Proceedings of the 13th International Conference on Artificial Intelligence and Statistics (AISTATS) 2010, Chia Laguna Resort, Sardinia, Italy. vol. 9 of JMLR: W&CP 9, pp. 297-304.

Koehn, Philipp, et al., "Six Challenges for Neural Machine Translation", arXiv:1706.03872v1 [cs.CL] Jun. 12, 2017, 12 pages.

Kudo, Taku, et al., "SentencePiece: A simple and language independent subword tokenizer and detokenizer for Neural Text Processing", arXiv:1808.06226v1 [cs.CL] Aug. 19, 2018, 6 pages.

Post, Matt, "A Call for Clarity in Reporting BLEU Scores", Amazon Research, Berlin, Germany, arXiv:1804.08771v2 [cs.CL] Sep. 12, 2018, 6 pages.

Stahlberg, Felix, et al., "On NMT Search Errors and Model Errors: Cat Got Your Tongue?", University of Cambridge, Department of Engineering, Trumpington St, Cambridge CB2 1PZ, UK, arXiv:1908.10090v1 [cs.CL] Aug. 27, 2019, 7 pages.

Sutskever, Ilya, et al., "Sequence to Sequence Learning with Neural Networks", arXiv:1409.3215v3 [cs.CL] Dec. 14, 2014, pp. 1-9.

You, Yang, et al., "Large Batch Optimization for Deep Learning: Training Bert in 76 Minutes", arXiv:1904.00962v5 [cs.LG] Jan. 3, 2020, Published as a conference paper at ICLR 2020, pp. 1-37.

* cited by examiner

100

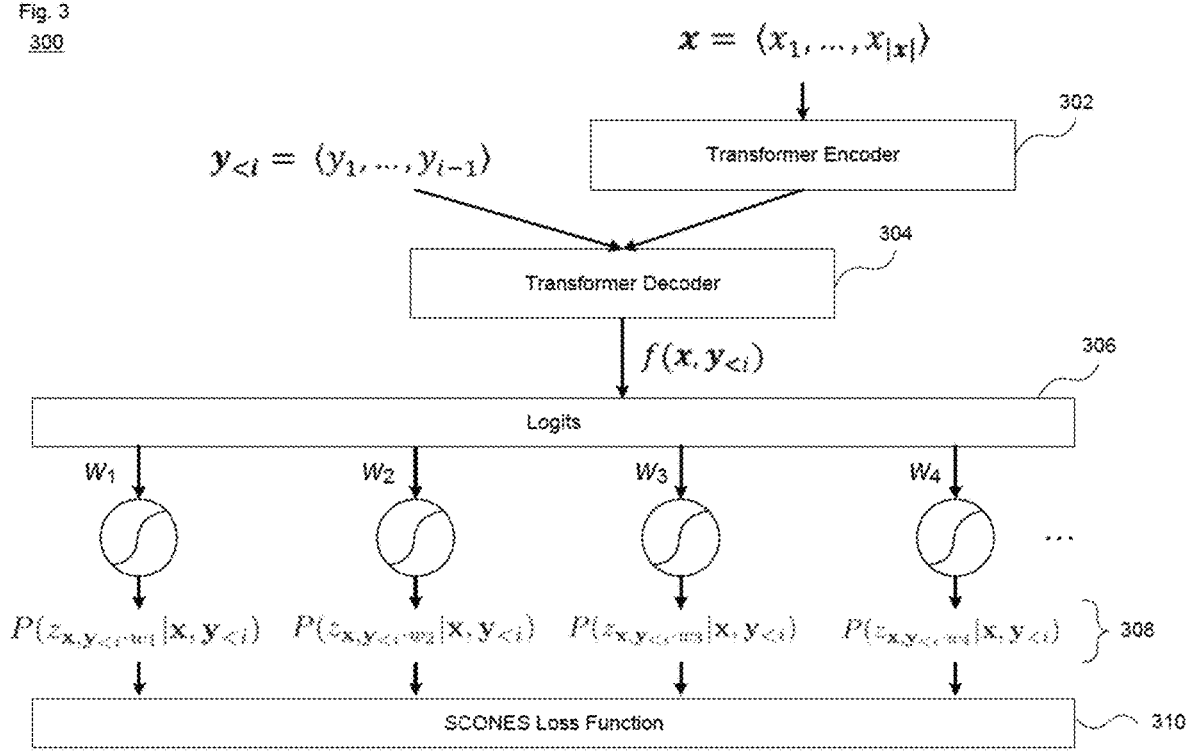

Fig. 4A

| Parameter | Value |
| --- | --- |
| Attention dropout rate | 0.1 |
| Attention layer size | 512 |
| Dropout rate | 0.1 |
| Embedding size | 512 |
| MLP dimension | 2,048 |
| Number of attention heads | 8 |
| Number of layers | 6 |
| Training batch size | 256 |
| Total number of parameters | 121M |

Table 1: Transformer hyper-parameters

Fig. 4B

| Language pair | #Training sentence pairs | |
| --- | --- | --- |
| | Unfiltered | Filtered |
| German-English | 39M | 33M |
| Finnish-English | 6.6M | 5.5M |
| Lithuanian-English | 2.3M | 2.0M |

Table 2: MT training set sizes

Fig. 5A
500

|  | Greedy search | | | | | |
|---|---|---|---|---|---|---|
|  | de-en | en-de | fi-en | en-fi | lt-en | en-lt |
| Softmax | 38.8 | 38.7 | 26.9 | 18.5 | 26.3 | 11.5 |
| SCONES | 39.9 | 39.1 | 27.6 | 19.5 | 27.7 | 12.5 |
| Rel. improvement | +2.7‡ | +1.2 | +2.8† | +5.4‡ | +5.3‡ | +8.5‡ |

Fig. 5B
520

|  | Beam search (beam size = 4) | | | | | |
|---|---|---|---|---|---|---|
|  | de-en | en-de | fi-en | en-fi | lt-en | en-lt |
| Softmax | 39.6 | 39.4 | 27.7 | 19.0 | 26.9 | 12.0 |
| SCONES | 40.3 | 39.8 | 28.4 | 20.0 | 28.9 | 12.6 |
| Rel. improvement | +1.7† | +0.9 | +2.7† | +5.5‡ | +7.4‡ | +5.7 |

Fig. 6

| Language pair | α |
|---|---|
| de-en | 0.5 |
| en-de | 0.5 |
| fi-en | 0.7 |
| en-fi | 1.0 |
| lt-en | 0.7 |
| en-lt | 0.9 |

Table 4: Values of α that yield the best greedy BLEU scores on the respective development sets.

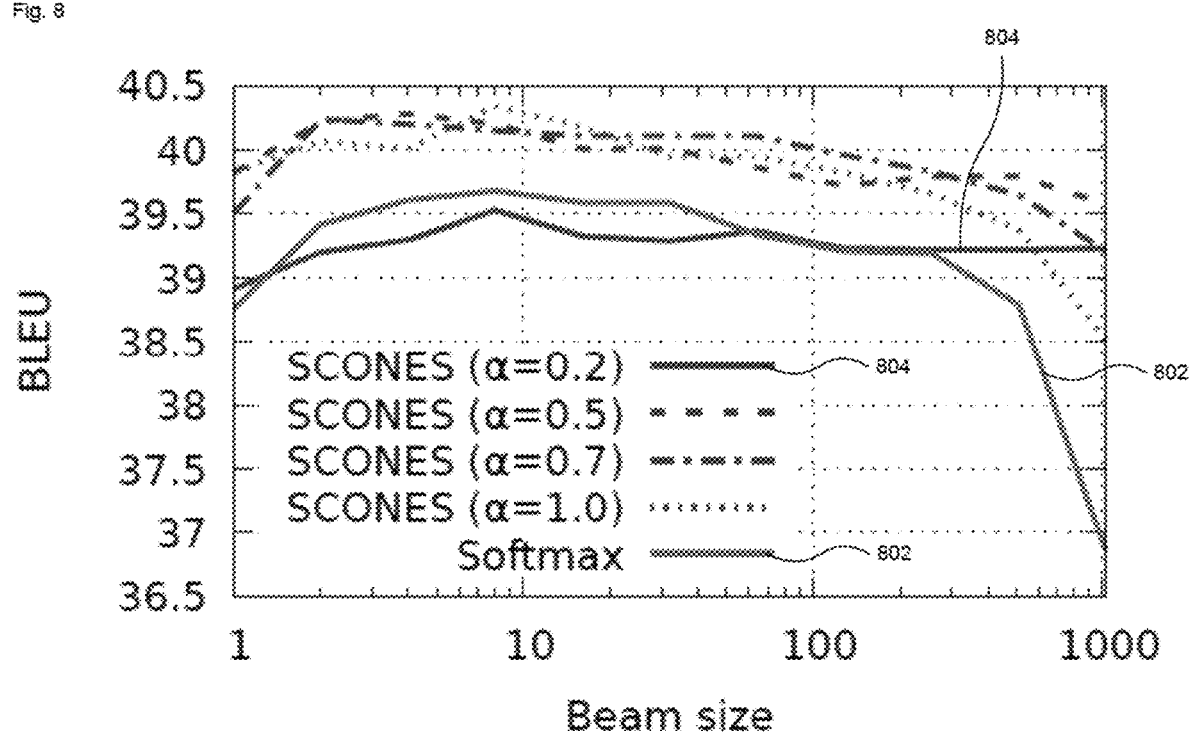

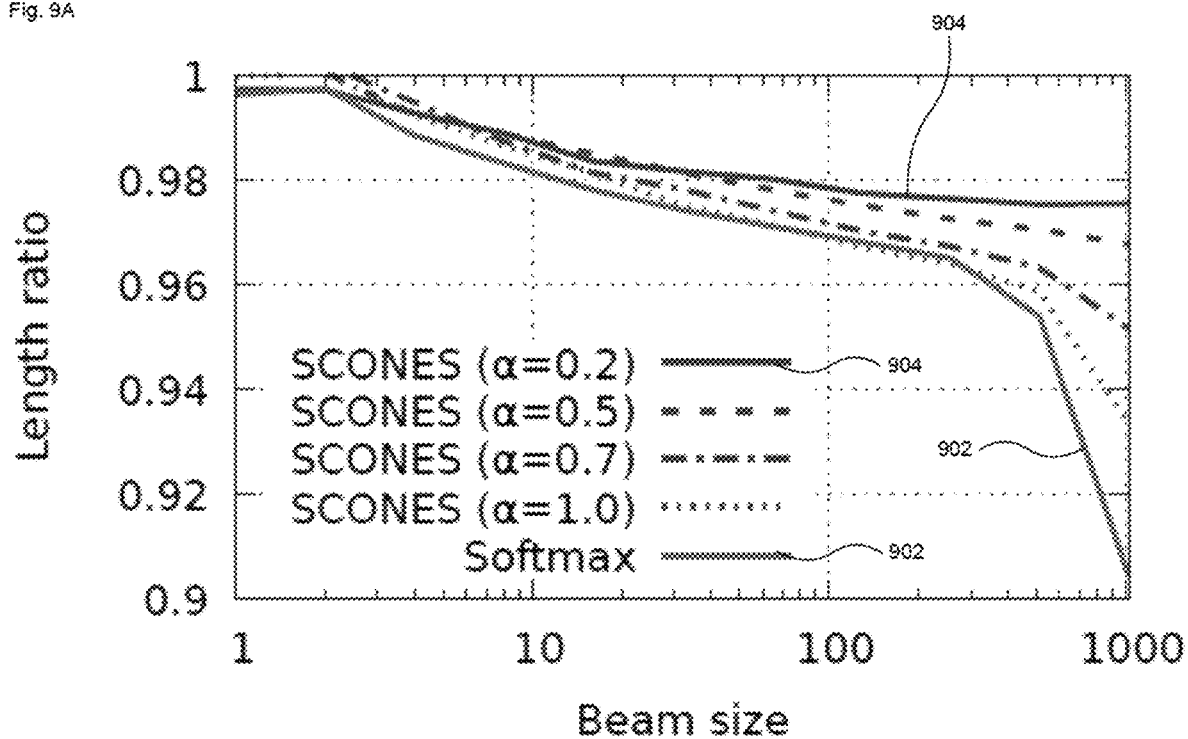

Fig. 10A
1000

|  | Beam search (beam size = 4) | | | | | |
| --- | --- | --- | --- | --- | --- | --- |
|  | de-en | en-de | fi-en | en-fi | lt-en | en-lt |
| Softmax | 39.6 | 39.4 | 27.7 | 19.0 | 26.9 | 12.0 |
| SCONES ($\alpha = 0.2$) | 39.3 | 38.9 | 27.7 | 19.6 | 27.9 | 12.7 |

Fig. 10B
1020

|  | Exact search | | | | | |
| --- | --- | --- | --- | --- | --- | --- |
|  | de-en | en-de | fi-en | en-fi | lt-en | en-lt |
| Softmax | 23.7 | 15.6 | 16.7 | 10.1 | 14.2 | 7.1 |
| SCONES ($\alpha = 0.2$) | 39.1 | 37.2 | 26.7 | 18.7 | 25.6 | 12.1 |

Fig. 12A

| Languages | Run | #incomplete sent. |
|---|---|---|
| de-en | SCONES ($\alpha = 0.2$) | 1.45% |
| de-en | SCONES ($\alpha = 0.5$) | 0.90% |
| de-en | SCONES ($\alpha = 0.7$) | 0.05% |
| en-de | SCONES ($\alpha = 0.2$) | 4.01% |
| fi-en | SCONES ($\alpha = 0.2$) | 1.30% |
| en-fi | Softmax | 0.10% |
| en-fi | SCONES ($\alpha = 0.2$) | 3.20% |
| lt-en | Softmax | 0.20% |
| lt-en | SCONES ($\alpha = 0.2$) | 5.20% |
| en-lt | Softmax | 0.10% |
| en-lt | SCONES ($\alpha = 0.2$) | 5.31% |

Fig. 12B

| Languages | Run | #incomplete sent. |
|---|---|---|
| synthetic-0.1 | Softmax | 1.05% |
| synthetic-0.1 | SCONES ($\alpha = 0.2$) | 0.55% |
| synthetic-0.1 | SCONES ($\alpha = 0.5$) | 1.10% |
| synthetic-0.1 | SCONES ($\alpha = 1.0$) | 1.25% |
| synthetic-0.2 | Softmax | 1.00% |
| synthetic-0.2 | SCONES ($\alpha = 0.2$) | 5.10% |
| synthetic-0.2 | SCONES ($\alpha = 0.5$) | 7.65% |
| synthetic-0.2 | SCONES ($\alpha = 1.0$) | 2.65% |
| synthetic-0.3 | Softmax | 0.10% |
| synthetic-0.3 | SCONES ($\alpha = 0.2$) | 12.6% |
| synthetic-0.3 | SCONES ($\alpha = 0.5$) | 17.3% |
| synthetic-0.3 | SCONES ($\alpha = 1.0$) | 1.80% |
| synthetic-0.5 | SCONES ($\alpha = 0.2$) | 25.0% |
| synthetic-0.5 | SCONES ($\alpha = 0.5$) | 25.2% |
| synthetic-0.7 | SCONES ($\alpha = 0.2$) | 25.9% |
| synthetic-0.7 | SCONES ($\alpha = 0.5$) | 20.3% |

Fig. 14

```
1  from flax import linen as nn
2  import jax
3  import jax.numpy as jnp
4
5  def compute_scones_loss(
6      logits,   # 3D float tensor [batch_size, max_sequence_length, vocab_size]
7      targets,  # 2D int tensor [batch_size, max_sequence_length]
8      l = 0.0,  # Label smoothing constant (lambda)
9      a = 1.0,  # Scaling factor alpha
10 ):
11     true_logprob = nn.log_sigmoid(logits)
12     false_logprob = jnp.log(jnp.maximum(1.0 - jnp.exp(true_logprob), 1.0e-30))
13     gather = jax.vmap(jax.vmap(lambda s, t: s[t]))
14     tgt_true_logprob = gather(true_logprob, targets)   # [batch_size, max_seq_length]
15     tgt_false_logprob = gather(false_logprob, targets) # [batch_size, max_seq_length]
16     tgt_true_xent = -(1.0 - l) * tgt_true_logprob - l * tgt_false_logprob
17     tgt_false_xent = -(1.0 - l) * tgt_false_logprob - l * tgt_true_logprob
18     all_false_xent = -(1.0 - l) * false_logprob - l * true_logprob
19     loss = a * (jnp.sum(all_false_xent, axis=-1) - tgt_false_xent) + tgt_true_xent
20     weights = jnp.where(targets > 0, 1, 0).astype(jnp.float32)  # PAD ID is 0.
21     return loss * weights / weights.sum()
```

1500

MODELING AMBIGUITY IN NEURAL MACHINE TRANSLATION

CROSS-REFERENCE TO RELATED APPLICATIONS

The present application is a continuation of International Application No. PCT/US2022/026683, filed Apr. 28, 2022, the entire disclosure of which is hereby incorporated by reference.

BACKGROUND

Machine translation (MT) is the automatic translation from a written sentence in one language into another language. Neural models for MT-neural machine translation (NMT)—may try to address different kinds of uncertainty. This can include model uncertainty in which the model itself is unsure which of two or more translations is correct, and intrinsic uncertainty in which there is more than one correct translation for an input sentence. Existing NMT models may use a softmax layer to define a probability distribution over all target language sentences. While this approach can account for uncertainty by spreading the probability mass accordingly, it cannot distinguish between the different kinds of uncertainty.

This shortcoming may cause many pathologies of neural machine translation models. One such pathology is that when the beam size is increased at inference time (when the model searches over a larger space of translations), the model prefers short translations when compared to the reference translations. This pathology may be addressed by dividing the model score by a function of the length of the translation or using a reward for longer candidate translations. However, such fixes are post-hoc and do not address the underlying causes of the pathologies. Thus, such NMT approaches can produce lower quality results or otherwise suffer a degradation in performance when used with larger beam sizes. As a result, the apps and services that employ such approaches may not provide suitable or appropriate results.

BRIEF SUMMARY

Aspects of the technology approach machine translation as a multi-label classification task. Rather than learning a single distribution P(y|x) over all target sentences y for a source sentence x, the system learns binary classifiers for each sentence pair (x,y) that indicate whether or not y is a valid translation of x. In this framework, intrinsic uncertainty can be represented by setting the probabilities of two (or more) correct translations $y_1$ and $y_2$ to 1 simultaneously. The probabilities for each translation can be computed using separate binary classifiers, and thus there is no requirement that the probabilities sum to one over all translations. In contrast to a typical machine translation model (e.g., a Transformer model) that uses a softmax output layer, the ambiguity modeling approach herein utilizes sigmoid activations (or another bounded activation function) that assign a probability between 0 and 1 to each token in the vocabulary (the set of all tokens) at each time step. In addition, a loss function, referred to herein as "Single-label Contrastive Objective for Non-Exclusive Sequences" (SCONES) allows models to be trained on single reference training data. This allows for modeling non-exclusive outputs. This approach can provide noticeable improvement over existing techniques regarding intrinsic uncertainty, and mitigates pathologies encountered by those other techniques. While this approach is particularly beneficial for text translation situations, it is also applicable to other types of classification problems with models for which training corpora normally contain single references, but for which multiple labels are acceptable in practice. One such type is text classification, such as when classifying a newspaper article, website content or a medical diagnosis.

According to one aspect of the technology, a system is configured for a machine translation model. The system comprises memory configured to store a set of text exemplars in a source language and a set of rewritten texts in one or more languages different from the source language, and one or more processing elements operatively coupled to the memory. The one or more processing elements implement the machine translation model as a neural network having an encoder module and a decoder module. The encoder module comprises an encoder neural network configured to receive a given text exemplar ($x=<x_1, \ldots, x_{|x|}>$) and to generate an encoded representation of the given text exemplar. The decoder module comprises a decoder neural network configured to receive the encoded representation and a set of translation prefixes ($y_{<i}=<y_1, \ldots, y_{i-1}>$) and to output an unbounded function $f(x, y_{<i})$ corresponding to a set of tokens associated with each pair of the given text exemplar x and translation prefix from the set of translation prefixes $y_{<i}$, wherein each token is assigned a probability between 0 and 1 in a vocabulary of the given text exemplar at each time step. A logits module is configured to act on the unbounded function to generate a corresponding bounded conditional probability for each token, wherein the conditional probabilities are not normalized over the vocabulary at each time step. A loss function module has a positive loss component and a scaled negative loss component, in which the loss function module is configured to identify whether each target text of a set of target texts is a valid translation of the given text exemplar.

The set of text exemplars may comprise a set of input sentences, and the system is configured to learn binary classifiers for each sentence pair (x,y) that indicate whether or not y is a valid translation of x. Here, intrinsic uncertainty may be represented by setting the conditional probabilities of at least two correct translations $y_1$ and $y_2$ to a maximum probability simultaneously. Alternatively or additionally, the logits module is configured to generate probabilities for each translation using separate binary classifiers.

In accordance with any of the above, a probability of a complete translation of the given text exemplar may be decomposed into a product of token-level probabilities. Alternatively or additionally, the logits module is configured to apply sigmoid activations to the unbounded function at each time step. Alternatively or additionally, the positive loss component applies a log function to the bounded conditional probability for each reference token, and the scaled negative loss component applies a log function to the bounded conditional probability for each non-reference token. Alternatively or additionally, during inference the system is configured to search for a translation that has a highest probability of being a translation of text segment to be translated.

In accordance with any of the above, the system is configured to express intrinsic uncertainty associated with machine translation model. Alternatively or additionally, the loss function module is configured to adjust scaling of the negative loss component to maximize translation performance.

In accordance with any of the above, the encoder module and the decoder module comprise a self-attention neural network encoder-decoder architecture. Alternatively the encoder module and the decoder module may comprise a sequence to sequence model architecture.

According to another aspect, a machine translation method employs a neural network, and the method comprises: storing, in memory, a set of text exemplars; receiving, by an encoder module comprising an encoder neural network, a given text exemplar ($x=<x_1, \ldots, x_{|x|}>$); generating, by the encoder module, an encoded representation of the given text exemplar; receiving, by a decoder module, the encoded representation and a set of translation prefixes ($y_{<i}=<y_1, \ldots, y_{i-1}>$); outputting, by the decoder module, an unbounded function $f(x, y_{<i})$ corresponding to a set of tokens associated with each pair of the given text exemplar x and translation prefix from the set of translation prefixes $y_{<i}$, wherein each token is assigned a probability between 0 and 1 in a vocabulary of the given text exemplar at each time step; generating, by a logits module based on the unbounded function, a corresponding bounded conditional probability for each token, wherein the conditional probabilities are not normalized over the vocabulary at each time step; and identifying, by a loss function module having a positive loss component and a scaled negative loss component, whether each target text of a set of target texts is a valid translation of the given text exemplar.

In one example, the set of text exemplars comprises a set of input sentences, and the method includes learning binary classifiers for each sentence pair (x,y) that indicate whether or not y is a valid translation of x. Here, intrinsic uncertainty may be represented by setting the conditional probabilities of at least two correct translations $y_1$ and $y_2$ to a maximum probability simultaneously. Alternatively or additionally, generating the corresponding bounded conditional probability for each token comprises generating probabilities for each translation using separate binary classifiers.

In accordance with any of the above, a probability of a complete translation of the given text exemplar may be decomposed into a product of token-level probabilities. Alternatively or additionally, generating the corresponding bounded conditional probability for each token may comprise applying sigmoid activations to the unbounded function at each time step. Alternatively or additionally, the positive loss component may apply a log function to the bounded conditional probability for each token, and the scaled negative loss component may apply a log function to the bounded conditional probability for each token.

In accordance with any of the above examples and aspects, the method may further comprise, during inference searching for a translation that has a highest probability of being a translation of text segment to be translated. Alternatively or additionally, the method may further comprise adjusting scaling of the negative loss component to maximize translation performance.

BRIEF DESCRIPTION OF THE DRAWINGS

FIG. 3 illustrates a multi-way NMT Transformer architecture for non-exclusive target sequences in accordance with aspects of the technology.

FIGS. 4A-B are tables showing Transformer hyper-parameters and MT training net sizes in accordance with aspects of the technology.

FIGS. 5A-B illustrate a comparison of a SCONES-based NMT systems with softmax baselines in accordance with aspects of the technology.

FIG. 6 illustrates a table of language pairs and a values based on BLEU scores in accordance with aspects of the technology.

FIG. 8 plots BLEU scores as a function of the beam size in accordance with aspects of the technology.

FIGS. 9A-B plot test results involving length ratio, beam size and a values in accordance with aspects of the technology.

FIGS. 10A-B illustrate tables comparing results for beam search and exact search in accordance with aspects of the technology.

FIGS. 12A-B illustrate tables of sampling information when testing according to IBM-3 in accordance with aspects of the technology.

FIG. 14 provides an example implementation of SCONES in JAX in accordance with aspects of the technology.

DETAILED DESCRIPTION

Overview

Figure 1:
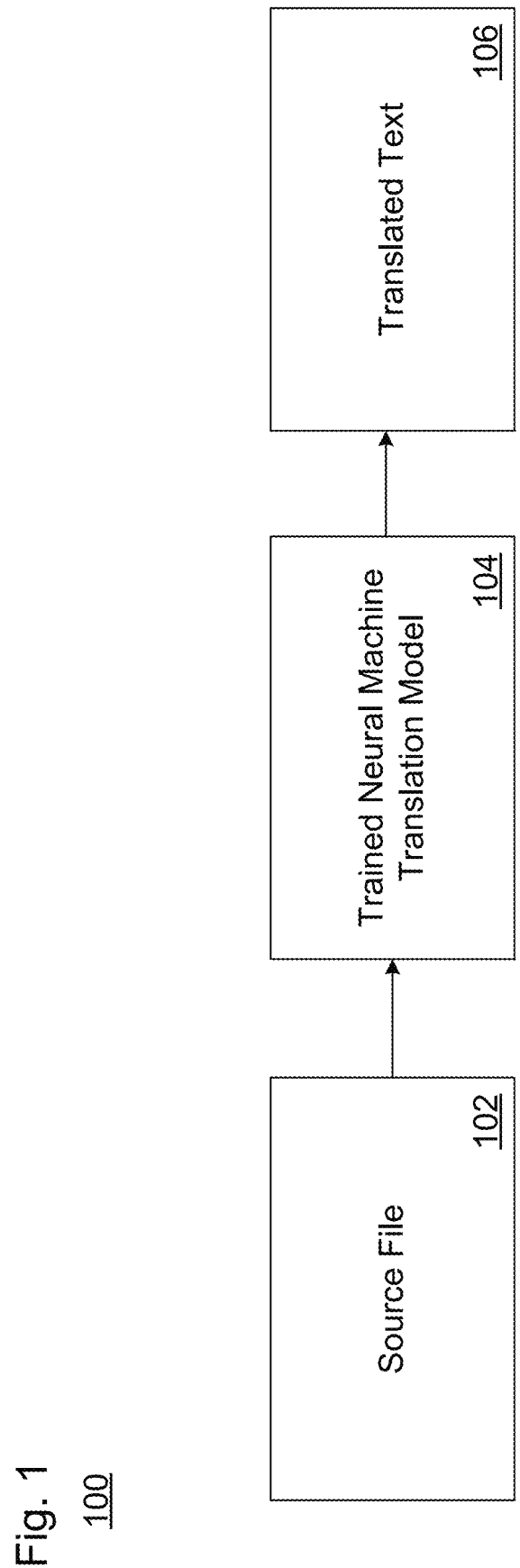
FIG. 1 illustrates an example of using a trained NMT model in a text-based application in accordance with aspects of the technology.

FIG. 1 illustrates a high-level example 100 of using a trained NMT model in a text-based application. In this example, one or more source files (e.g., curated text files in one or more selected languages) in block 102 are applied to a trained model at block 104. The output from the model is translated text 106, which is in a different language than the original language. The translated text can be used in a variety of applications, including machine translation, grammatical error correction, dialogue modeling or automatic foreign-language subtitling (e.g., for video content), etc. The translated text can be evaluated via a comparison against a baseline translation (e.g., a human-created gold translation).

Some traditional NMT models may be based on a Transformer architecture. This architecture, as detailed below, employs a softmax function to generate a set of output probabilities (a probability distribution). However, the softmax layer in neural machine translation is designed to model the distribution over mutually exclusive tokens. Machine translation, however, is intrinsically uncertain: the same source sentence can have multiple semantically equivalent translations. Therefore, one aspect of the technology replaces the softmax activation with a multi-label classification layer that can model ambiguity more effectively.

A SCONES loss function enables the modeling of non-exclusive outputs. The multi-label output layer can still be trained on single reference training data using the SCONES loss function. SCONES yields consistent BLEU score gains across various translation directions, particularly for medium resource language pairs and small beam sizes. By using smaller beam sizes, the approach can speed up inference by a factor on the order of 3.9× and still match or improve the softmax BLEU score, as shown in testing. Furthermore, SCONES can be used to train NMT models that assign the highest probability to adequate translations, thus mitigating the "beam search curse". As detailed below, additional experiments on synthetic language pairs with varying levels of uncertainty indicate that the improvements from SCONES over other approaches can be attributed to better handling of ambiguity.

General Transformer Approach

Figure 2:
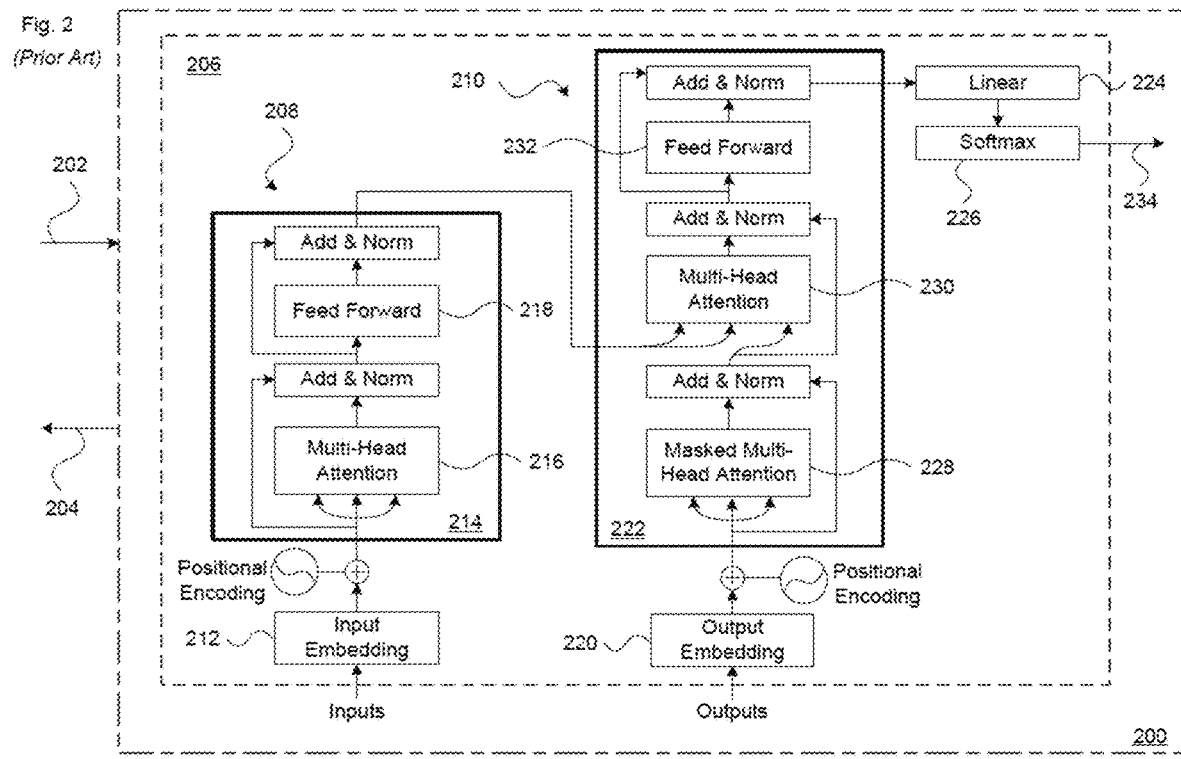
FIG. 2 illustrates a Transformer-type architecture that may be employed in accordance with aspects of the technology.
Figure 7A:
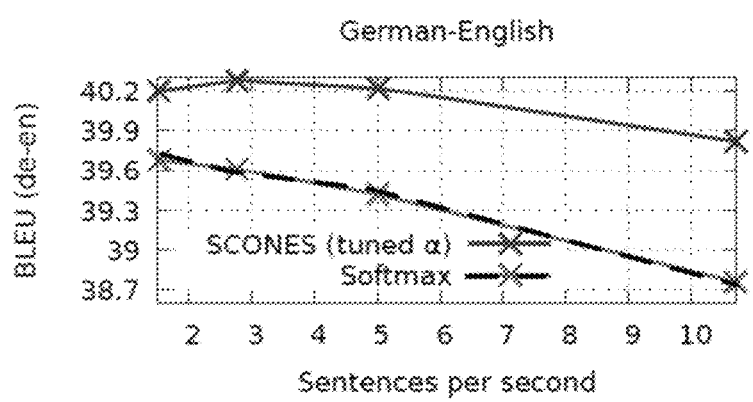
FIGS. 7A-F are plots show BLEU scores for different translation directions as a function of decoding speed in accordance with aspects of the technology.
Figure 7B:
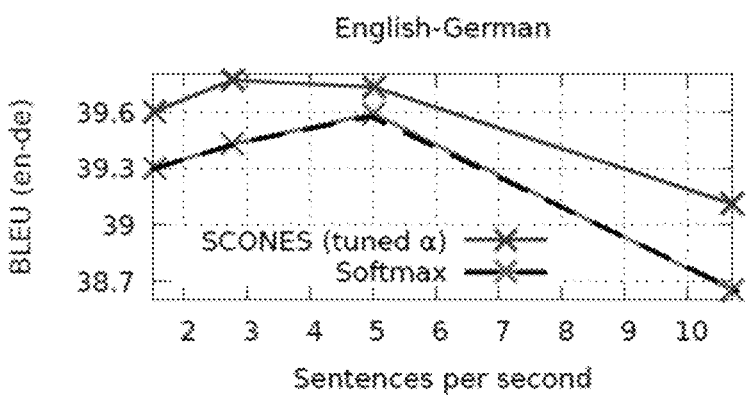
Figure 7C:
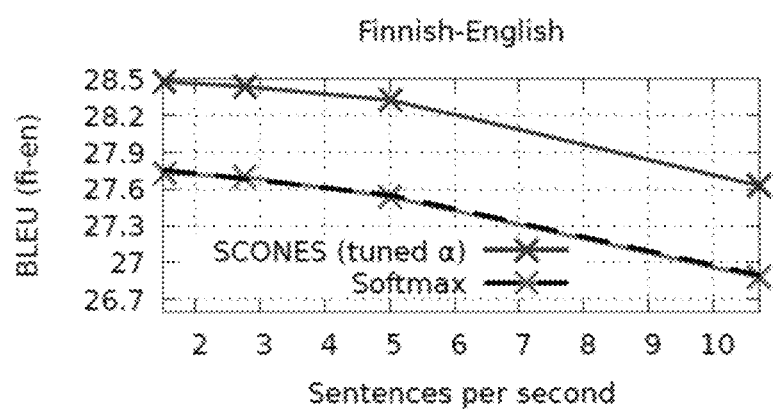
Figure 7D:
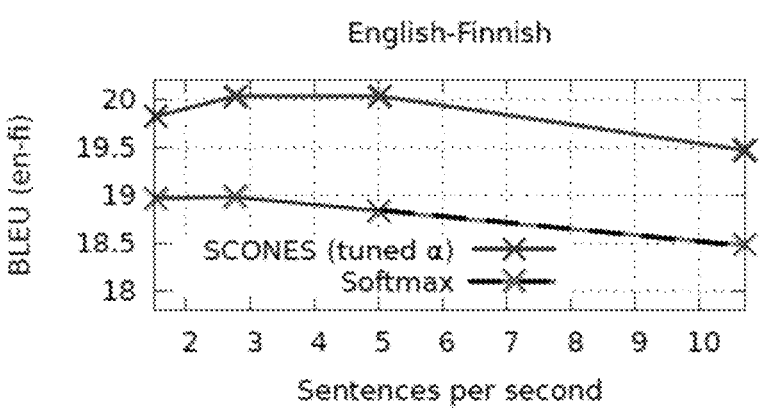
Figure 7E:
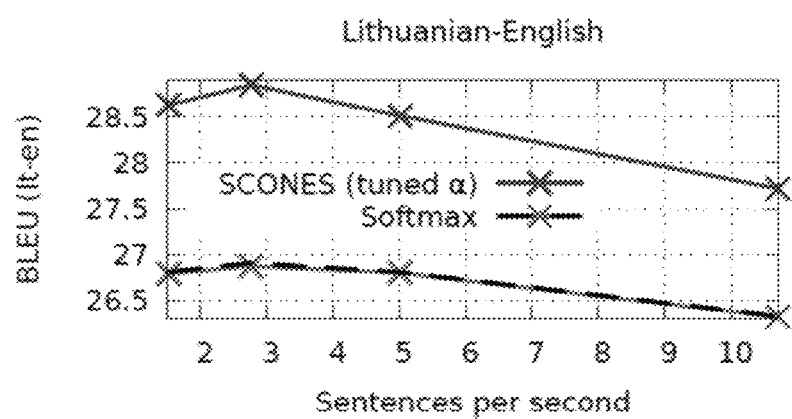
Figure 7F:
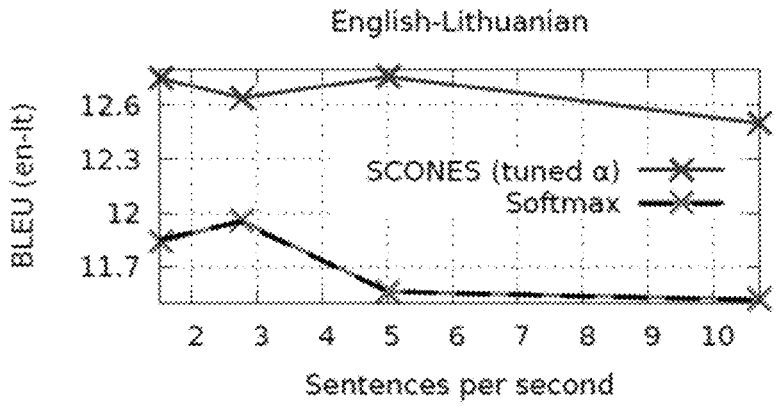

The SCONES approach may employ a self-attention architecture, e.g., the Transformer neural network encoder-decoder architecture. An exemplary general Transformer-type architecture is shown in FIG. 2, which is based on the arrangement shown in U.S. Pat. No. 10,452,978, entitled "Attention-based sequence transduction neural networks", the entire disclosure of which is incorporated herein by reference. While a Transformer-type architecture may be employed, the approach described herein can also be utilized with different architectures. For instance, sequence to sequence models, such as those that use a long short-term memory (LSTM) architecture.

System 200 of FIG. 2 is implementable as computer programs by processors of one or more computers in one or more locations. The system 200 receives an input sequence 202 and processes the input sequence 202 to transduce the input sequence 202 into an output sequence 204. The input sequence 202 has a respective network input at each of multiple input positions in an input order and the output sequence 204 has a respective network output at each of multiple output positions in an output order.

System 200 can perform any of a variety of tasks that require processing sequential inputs to generate sequential outputs. System 200 includes an attention-based sequence transduction neural network 206, which in turn includes an encoder neural network 208 and a decoder neural network 210. The encoder neural network 208 is configured to receive the input sequence 202 and generate a respective encoded representation of each of the network inputs in the input sequence. An encoded representation is a vector or other ordered collection of numeric values. The decoder neural network 210 is then configured to use the encoded representations of the network inputs to generate the output sequence 204. Generally, both the encoder 208 and the decoder 210 are attention-based. In some cases, neither the encoder nor the decoder includes any convolutional layers or any recurrent layers. The encoder neural network 208 includes an embedding layer (input embedding) 212 and a sequence of one or more encoder subnetworks 214. The encoder neural 208 network may comprise N encoder subnetworks 214.

The embedding layer 212 is configured, for each network input in the input sequence, to map the network input to a numeric representation of the network input in an embedding space, e.g., into a vector in the embedding space. The embedding layer 212 then provides the numeric representations of the network inputs to the first subnetwork in the sequence of encoder subnetworks 214. The embedding layer 212 may be configured to map each network input to an embedded representation of the network input and then combine, e.g., sum or average, the embedded representation of the network input with a positional embedding of the input position of the network input in the input order to generate a combined embedded representation of the network input. In some cases, the positional embeddings are learned. As used herein, "learned" means that an operation or a value has been adjusted during the training of the sequence transduction neural network 206. In other cases, the positional embeddings may be fixed and are different for each position.

The combined embedded representation is then used as the numeric representation of the network input. Each of the encoder subnetworks 214 is configured to receive a respective encoder subnetwork input for each of the plurality of input positions and to generate a respective subnetwork output for each of the plurality of input positions. The encoder subnetwork outputs generated by the last encoder subnetwork in the sequence are then used as the encoded representations of the network inputs. For the first encoder subnetwork in the sequence, the encoder subnetwork input is the numeric representations generated by the embedding layer 212, and, for each encoder subnetwork other than the first encoder subnetwork in the sequence, the encoder subnetwork input is the encoder subnetwork output of the preceding encoder subnetwork in the sequence.

Each encoder subnetwork 214 includes an encoder self-attention sub-layer 216. The encoder self-attention sub-layer 216 is configured to receive the subnetwork input for each of the plurality of input positions and, for each particular input position in the input order, apply an attention mechanism over the encoder subnetwork inputs at the input positions using one or more queries derived from the encoder subnetwork input at the particular input position to generate a respective output for the particular input position. In some cases, the attention mechanism is a multi-head attention mechanism as shown. In some implementations, each of the encoder subnetworks 214 may also include a residual connection layer that combines the outputs of the encoder self-attention sub-layer with the inputs to the encoder self-attention sub-layer to generate an encoder self-attention residual output and a layer normalization layer that applies layer normalization to the encoder self-attention residual output. These two layers are collectively referred to as an "Add & Norm" operation in FIG. 2.

Some or all of the encoder subnetworks can also include a position-wise feed-forward layer 218 that is configured to operate on each position in the input sequence separately. In particular, for each input position, the feed-forward layer 218 is configured receive an input at the input position and apply a sequence of transformations to the input at the input position to generate an output for the input position. The inputs received by the position-wise feed-forward layer 218 can be the outputs of the layer normalization layer when the residual and layer normalization layers are included or the outputs of the encoder self-attention sub-layer 216 when the residual and layer normalization layers are not included. The transformations applied by the layer 218 will generally be the same for each input position (but different feed-forward layers in different subnetworks may apply different transformations).

In cases where an encoder subnetwork 214 includes a position-wise feed-forward layer 218 as shown, the encoder subnetwork can also include a residual connection layer that combines the outputs of the position-wise feed-forward layer with the inputs to the position-wise feed-forward layer to generate an encoder position-wise residual output and a layer normalization layer that applies layer normalization to the encoder position-wise residual output. As noted above, these two layers are also collectively referred to as an "Add & Norm" operation. The outputs of this layer normalization layer can then be used as the outputs of the encoder subnetwork 214.

Once the encoder neural network 208 has generated the encoded representations, the decoder neural network 210 is configured to generate the output sequence in an auto-regressive manner. That is, the decoder neural network 210 generates the output sequence, by at each of a plurality of generation time steps, generating a network output for a corresponding output position conditioned on (i) the encoded representations and (ii) network outputs at output positions preceding the output position in the output order. In particular, for a given output position, the decoder neural network generates an output that defines a probability distribution over possible network outputs at the given output position. The decoder neural network can then select a network output for the output position by sampling from the probability distribution or by selecting the network output with the highest probability.

Because the decoder neural network 210 is auto-regressive, at each generation time step, the decoder network 210 operates on the network outputs that have already been generated before the generation time step, i.e., the network outputs at output positions preceding the corresponding output position in the output order. In some implementations, to ensure this is the case during both inference and training, at each generation time step the decoder neural network 210 shifts the already generated network outputs right by one output order position (i.e., introduces a one position offset into the already generated network output sequence) and (as will be described in more detail below) masks certain operations so that positions can only attend to positions up to and including that position in the output sequence (and not subsequent positions). While the remainder of the description below describes that, when generating a given output at a given output position, various components of the decoder 210 operate on data at output positions preceding the given output positions (and not on data at any other output positions), it will be understood that this type of conditioning can be effectively implemented using shifting.

The decoder neural network 210 includes an embedding layer (output embedding) 220, a sequence of decoder subnetworks 222, a linear layer 224, and a softmax layer 226. In particular, the decoder neural network can include N decoder subnetworks 222. However, while the example of FIG. 2 shows the encoder 208 and the decoder 210 including the same number of subnetworks, in some cases the encoder 208 and the decoder 210 include different numbers of subnetworks. The embedding layer 220 is configured to, at each generation time step, for each network output at an output position that precedes the current output position in the output order, map the network output to a numeric representation of the network output in the embedding space. The embedding layer 220 then provides the numeric representations of the network outputs to the first subnetwork 222 in the sequence of decoder subnetworks.

In some implementations, the embedding layer 220 is configured to map each network output to an embedded representation of the network output and combine the embedded representation of the network output with a positional embedding of the output position of the network output in the output order to generate a combined embedded representation of the network output. The combined embedded representation is then used as the numeric representation of the network output. The embedding layer 220 generates the combined embedded representation in the same manner as described above with reference to the embedding layer 212.

Each decoder subnetwork 222 is configured to, at each generation time step, receive a respective decoder subnetwork input for each of the plurality of output positions preceding the corresponding output position and to generate a respective decoder subnetwork output for each of the plurality of output positions preceding the corresponding output position (or equivalently, when the output sequence has been shifted right, each network output at a position up to and including the current output position). In particular, each decoder subnetwork 222 includes two different attention sub-layers: a decoder self-attention sub-layer 228 and an encoder-decoder attention sub-layer 230. Each decoder self-attention sub-layer 228 is configured to, at each generation time step, receive an input for each output position preceding the corresponding output position and, for each of the particular output positions, apply an attention mechanism over the inputs at the output positions preceding the corresponding position using one or more queries derived from the input at the particular output position to generate a updated representation for the particular output position. That is, the decoder self-attention sub-layer 228 applies an attention mechanism that is masked so that it does not attend over or otherwise process any data that is not at a position preceding the current output position in the output sequence.

Each encoder-decoder attention sub-layer 230, on the other hand, is configured to, at each generation time step, receive an input for each output position preceding the corresponding output position and, for each of the output positions, apply an attention mechanism over the encoded representations at the input positions using one or more queries derived from the input for the output position to generate an updated representation for the output position. Thus, the encoder-decoder attention sub-layer 230 applies attention over encoded representations while the decoder self-attention sub-layer 228 applies attention over inputs at output positions.

In the example of FIG. 2, the decoder self-attention sub-layer 228 is shown as being before the encoder-decoder attention sub-layer in the processing order within the decoder subnetwork 222. In other examples, however, the decoder self-attention sub-layer 228 may be after the encoder-decoder attention sub-layer 230 in the processing order within the decoder subnetwork 222 or different subnetworks may have different processing orders. In some implementations, each decoder subnetwork 222 includes, after the decoder self-attention sub-layer 228, after the encoder-decoder attention sub-layer 230, or after each of the two sub-layers, a residual connection layer that combines the outputs of the attention sub-layer with the inputs to the attention sub-layer to generate a residual output and a layer normalization layer that applies layer normalization to the residual output.

Some or all of the decoder subnetwork 222 also include a position-wise feed-forward layer 232 that is configured to operate in a similar manner as the position-wise feed-forward layer 218 from the encoder 208. In particular, the layer 232 is configured to, at each generation time step: for each output position preceding the corresponding output position: receive an input at the output position, and apply a sequence of transformations to the input at the output position to generate an output for the output position. The inputs received by the position-wise feed-forward layer 232 can be the outputs of the layer normalization layer (following the last attention sub-layer in the subnetwork 222) when the residual and layer normalization layers are included or the outputs of the last attention sub-layer in the subnetwork 222 when the residual and layer normalization layers are not included. In cases where a decoder subnetwork 222 includes a position-wise feed-forward layer 232, the decoder subnetwork can also include a residual connection layer that combines the outputs of the position-wise feed-forward layer with the inputs to the position-wise feed-forward layer to generate a decoder position-wise residual output and a layer normalization layer that applies layer normalization to the decoder position-wise residual output. These two layers are also collectively referred to as an "Add & Norm" operation. The outputs of this layer normalization layer can then be used as the outputs of the decoder subnetwork 222.

At each generation time step, the linear layer 224 applies a learned linear transformation to the output of the last decoder subnetwork 222 in order to project the output of the last decoder subnetwork 222 into the appropriate space for processing by the softmax layer 226. The softmax layer 226 then applies a softmax function over the outputs of the linear layer 224 to generate the probability distribution (output probabilities) 234 over the possible network outputs at the generation time step. The decoder 210 can then select a network output from the possible network outputs using the probability distribution.

Overall SCONES Architecture

For textual translations using a set of source text exemplars, other neural machine translation (NMT) models may learn the probability P(y|x) of the target sentence y given the source sentence x. This framework implies that there is a single best translation for a given source sentence: if there were multiple valid translations $y_1$ and $y_2$ they would need to share probability mass (e.g., $P(y_1|x)=0.5$ and $P(y_2|x)=0.5$), but such a distribution could also represent model uncertainty, i.e., the case when either $y_1$ or $y_2$ are correct translations. Therefore, learning a single distribution over all target language sentences does not allow the model to naturally express intrinsic uncertainty, the nature of the translation task to allow multiple semantically equivalent translations for a given source sentence. Single distributions over all sequences represent uncertainty by assigning probabilities, but they cannot distinguish between different kinds of uncertainty (e.g., model uncertainty versus intrinsic uncertainty).

In contrast, aspects of the technology frame machine translation as a multi-label classification task. With this approach, rather than learning a single distribution P(y|x) over all target sentences y for a source sentence x, the system learns binary classifiers for each sentence pair (x, y) that indicate whether or not y is a valid translation of x. In this framework, intrinsic uncertainty can be represented by setting the probabilities of two (or more) correct translations $y_1$ and $y_2$ to a maximum, e.g., a "1" on a scale of 0-1, simultaneously.

The probabilities for each translation are computed using separate binary classifiers, and thus there is no requirement that the probabilities sum to 1 over all translations. In practice, the probability of a complete translation is decomposed into a product of the token-level probabilities. In one aspect, a softmax output layer in Transformer model (e.g., 226 in FIG. 2) is replaced with sigmoid activations that assign a probability between 0 and 1 to each token in the vocabulary at each time step. Alternatively, instead of sigmoid activations, another bounded activation function may be employed such as tanh. The SCONES loss function allows the system to train models on single reference training data. Unlike noise-contrastive estimation (NCE), which had a primary goal to efficiently train models over large vocabularies, using the SCONES approach enables modeling of non-exclusive outputs.

Testing has demonstrated multiple benefits of training NMT models using SCONES when compared to standard cross-entropy with regular softmax. This can include consistent BLEU score gains between 1%-9% across six different translation directions. SCONES with greedy search typically outperforms softmax with beam search, resulting in inference speed-ups of up to 3.9× compared to softmax without any degradation in the BLEU score.

In addition, SCONES mitigates pathologies of traditional NMT models. Softmax-based models have been shown to assign the highest probability to either empty or inadequate translations (modes). This behavior manifests itself as the "beam search curse" where increasing the beam size may lead to worse translation quality, as described in "Six challenges for neural machine translation" by Koehn and Knowles, published in 2017 in the Proceedings of the First Workshop on Neural Machine Translation, pages 28-39, by the Association for Computational Linguistics (the entire disclosure of which is incorporated herein by reference). Testing shows that SCONES can be used to train models that a) assign the highest probability to adequate translations and b) do not suffer from the beam search curse.

SCONES may also be used to train models on synthetic translation pairs that were generated by sampling from the IBM Model 3 ("IBM-3") (see "The mathematics of statistical machine translation: Parameter estimation" by Brown et al., published in 1993 in Computational Linguistics, the entire disclosure of which is incorporated herein by reference. By varying the sampling temperature (the entropy of the distribution), one can control the level of ambiguity in the language pair. Testing shows that SCONES is effective in improving the adequacy of the highest probability translation for highly ambiguous translation pairs, confirming that SCONES can handle intrinsic uncertainty highly effectively.

Training NMT Models with SCONES

With regard to model training, the (subword) vocabulary is denoted as $V=\{w_1, \ldots, w_{|V|}\}$, the special end-of-sentence symbol as $w_1=</s>$, the source sentence as $x=(x_1, \ldots, x_{|V|}) \in V^*$, a translation as $y=(y_1, \ldots, y_{|V|}) \in V^*$, and a translation prefix as $y_{\leq i}=(y_1, \ldots, y_i)$. A center dot "·" is used for string concatenations. Unlike other NMT approaches that may model a single distribution P(y|x) over all target language sentences, SCONES learns a separate binary classifier for each sentence pair (x, y). A Boolean function is defined as t(·,·) to indicate whether y is a valid translation of x, so that t(x,y):=true if y is a translation of x; false otherwise.

This approach does not model t(·,·) directly. To guide decoding, variables $z_{x,y}$ are learned, which generalize t(·,·) to translate prefixes:

$$z_{x,y} := \begin{cases} 1 & \exists y' \in V^* : t(x, y \cdot y') = \text{true}, \\ 0 & \text{othewise} \end{cases}$$

i.e., $z_{x,y}$ is a binary label for the pair (x,y) associated with source sentence x and the translation prefix y:$z_{x,y}=1$ iff. y is a prefix of a valid translation of x. Its probability is decomposed as a product of conditionals to facilitate left-to-right beam decoding as follows (as a base case, $P(z_{x,\epsilon}=1|x)=1$ for the empty translation prefix):

$$P(z_{x,y} = 1|x) = \prod_{i=1}^{|y|} P(z_{x,y_{\leq i}} = 1|z_{x,y_{<i}} = 1, x) = \prod_{i=1}^{|y|} P(z_{x,y_{\leq i}} = 1|x, y_{<i}).$$

The conditional probabilities are assigned by applying the sigmoid activation function $\sigma(\cdot)$ to the logits (in which the logits are vectors of raw predictions that the model generates prior to normalization):

$$P(z_{x,y_{<i},w} = 1|x, y_{<i}) = \sigma(f(x, y_{<i})_w)$$

Here $w \in V$ is a single token, $f(x, y_{\leq i}) \in \mathbb{R}^{|V|}$ are the logits at time step i, and $f(x, y_{<i})_w$ is the logit corresponding to token w.

An architectural difference to a standard NMT model is the output activation. In particular, instead of the softmax function that yields a single distribution over the full vocabulary, multiple sigmoid activations are used in each logit component to define separate Bernoulli distributions for each item in the vocabulary. This is illustrated with reference to example 300 of FIG. 3, which shows a multiway NMT Transformer architecture for non-exclusive target sequences. In this figure, the source sentence x is applied to transformer encoder 302 and the output from the transformer encoder 304 is applied to transformer decoder 304 along with translation prefix $y_{<i}$. The output of the transformer decoder 304, $f(x, y_{\leq i})$, is applied to logits 306. The transformer decoder output is bounded with a logistic activation function, $\sigma$, where $\sigma(f(\ ))$ is the bounded activation function. For each token w (e.g., $w_1, w_2, w_3, w_4$, etc.), a corresponding conditional probability P 308 is obtained.

However, using such a multi-label classification view requires a different training loss function because, unlike the logits from a softmax, the logits in equation above for the conditional probabilities do not provide a normalized distribution over the vocabulary. An additional challenge is that existing MT training datasets typically do not provide more than one reference translation. The SCONES loss function aims to balance two token-level objectives using a scaling factor $\alpha \in \mathbb{R}^+$:

$$\mathcal{L}(x, y) = \frac{1}{|y|} \sum_{i=1}^{|y|} \mathcal{L}_{SCONES}(x, y, i),$$

where $$\mathcal{L}_{SCONES}(x, y, i) = \mathcal{L}_+(x, y, i) + \alpha \mathcal{L}_-(x, y, i)$$

Here, $\mathcal{L}_+(\cdot)$ is designed to increase the log-probability $P(z_{x,y_{\leq i}} = 1|x, y_{<i})$ of the gold label $y_i$ since it is a valid extension of the translation prefix $y_{\leq i}$. By way of example, the positive loss component applies a log function to the bounded conditional probability for each reference token. Block 310 in FIG. 3 illustrates the probabilities 308 of the bounded activation function being applied to the SCONES loss function. Aspects of the loss function include:

$$\mathcal{L}_+(x, y, i) = -\log P(z_{x,y_{\leq i}} = 1 \mid x, y_{<i})$$

$$= -\log \sigma(f(x, y_{<i})_{y_i}).$$

$\mathcal{L}_-(\cdot)$ is designed to reduce the probability $P(z_{x,y_{<i},w} = 1|x, y_{<i})$ for all labels w except for the gold label $y_i$:

$$\mathcal{L}_-(x, y, i) = -\sum_{w \in V \setminus \{y_i\}} \log P(z_{x,y_{<i},w} = 0|x, y_{<i}) =$$

$$-\sum_{w \in V \setminus \{y_i\}} \log(1 - \sigma(f(x, y < i)_w)).$$

By way of example, the negative loss component applies a log function to the bounded conditional probability for each non-reference token.

During inference, to generate a translation result, the system searches for the translation y* that ends with </s> and has the highest probability of being a translation of x:

$$y^* = y \in \{w \cdot </s> | w \in V^*\} \overset{\text{argmax}}{P}(z_{x,y} = 1|x),$$

which equals:

$$y \in \{w \cdot </s> | w \in V^*\} \overset{\text{argmax}}{\sum_{i=1}^{|y|}} \log \sigma(f(x, y_{<i})_{y_i})$$

This decision rule can be approximated with a vanilla beam search, which is a standard beam search algorithm for sequence to sequence models. Such a beam search takes the best N tokens, and selects the best N partial sequences (at each time step), considering the probabilities of the combination for all preceding words in addition to the word in the current location. An example is described in "Sequence to Sequence Learning with Neural Networks" by Sutskever et al., published Dec. 14, 2014, the entire disclosure of which is incorporated herein by reference.

For evaluation purposes, the same inference code is used for both softmax baselines and the SCONES trained models. Here, the only difference would be that the logits from SCONES models are transformed by a sigmoid instead of a softmax activation—in other words no summation over the full vocabulary (set of all tokens) is necessary.

Relation to Noise-Contrastive Estimation

The SCONES loss function is related to noise-contrastive estimation (NCE) in the sense that both methods reformulate next word prediction as a multi-label classification problem, and both losses have a "positive" component for the gold label, and a "negative" component for other labels. However, unlike NCE, the negative loss component ($\mathcal{L}_-(\cdot)$) in SCONES does not require sampling from a noise distribution as it makes use of all tokens in the vocabulary besides the gold token. This is possible because the SCONES approach is able to operate on a limited (e.g., 32K) subword vocabulary, whereas NCE is typically used to train language models with much larger word-level vocabularies. In addition, NCE has a "self-normalization" property which can reduce computation by avoiding the expensive partition function for distributions over the full vocabulary. To do so, NCE uses the multi-label classification task as a proxy problem. By contrast, in SCONES, the multi-label classification perspective is used to express the intrinsic uncertainty in MT and is not simply a proxy for the full softmax. Thus, a primary motivation for SCONES is not self-normalization over the full vocabulary. Details regarding NCE may be found in "Noise-contrastive estimation: A new estimation principle for unnormalized statistical models" by Gutmann and Hyvärinen, in the Proceedings of the thirteenth international conference on artificial intelligence and statistics, pages 297-304, JMLR Workshop and Conference Proceedings, the entire disclosure of which is incorporated herein by reference.

Experimental Setup

In order to understand certain benefits and advantages of the SCONES approach, it is helpful to compare NMT models trained with SCONES with well-trained standard softmax-based models. To do this, the setup can be kept simple, reproducible, and computationally economical. In one situation, Transformer models were trained according to the example of FIG. 4A, in which Table 1 lists the various Transformer hyper-parameters. Transformer models were trained in six translation directions—German-English (de-en), Finnish-English (en-fi), Lithuanian-English220 (lt-en), and the reverse directions—on the WMT19 training sets as provided by TensorFlow Datasets. These languages pairs were selected to experiment with different training set sizes, as identified in Table 2 of FIG. 4B.

The training sets were filtered using language ID and simple length-based heuristics, and split into subwords using joint 32K SentencePiece models, as described in "SentencePiece: A simple and language independent subword tokenizer and detokenizer for neural text processing" by Kudo and Richardson, Proceedings of the 2018 Conference on Empirical Methods in Natural Language Processing: System Demonstrations, pages 66-71, Brussels, Belgium, the entire disclosure of which is incorporated herein by reference.

In this experimental setup, all of the models were trained until convergence on the development set (between 100K and 700K training steps) using the LAMB optimizer in JAX. Details about the LAMB optimizer may be found in "Large batch optimization for deep learning: Training BERT in 76 minutes", by You et al., 2020, in the International Conference on Learning Representations, the entire disclosure of which is incorporated herein by reference. Details about JAX may be found in "JAX: Composable transformations of Python+NumPy programs", by Bradbury et al. in 2018, the entire disclosure of which is incorporated herein by reference.

The softmax baselines were trained by minimizing cross-entropy without label smoothing. The multi-way NMT models were trained by minimizing the SCONES loss function described above, also without label smoothing. The models were evaluated on the WMT19 test sets with SacreBLEU, using the WMT18 test sets as development sets to tune a. As an additional optimization, a greedy search implementation is configured to operate directly on the logits without applying the output activations. Details regarding SacreBLEU can be found in "A call for clarity in reporting BLEU scores" by Matt Post, 2018, in Proceedings of the Third Conference on Machine Translation: Research Papers, pages 186-191, the entire disclosure of which is incorporated herein by reference.

Experimental Results

The tables 500 and 520 in FIGS. 5A-B compares a SCONES-based NMT systems with the softmax baselines when a is tuned based on the BLEU score on the development set shown in the table of FIG. 6. As shown, SCONES yields consistent improvements across the board. For four of six language pairs (all except en-de and fi-en), SCONES with greedy search is even able to outperform the softmax models with beam search. The language pairs with fewer resources (fi↔en, lt↔en) benefit from SCONES training much more than the high-resource language pairs (de↔en).

The softmax-based models reach their (near) optimum BLEU score with a beam size of around 4. Most of the SCONES models can achieve similar or better BLEU scores with greedy search. Replacing beam-4 search with greedy search corresponds to a 3.9× speed-up (2.76→10.64 sentences per second) on an entry-level NVIDIA Quadro P1000 GPU with a batch size of 4.8

FIGS. 7A-F show the BLEU scores for all six translation directions as a function of decoding speed. Here, the SCONES results are all above the softmax results. Most of the speed-ups are due to choosing a smaller beam size and not due to SCONES avoiding the normalization over the full vocabulary. Further speed-ups from SCONES are expected when comparing models with larger vocabularies.

Mitigating the Beam Search Curse

As noted above, one of the most irksome pathologies of traditional softmax-based NMT models is the "beam search curse", in which larger beam sizes improve the log-probability of the translations, but the translation quality gets worse. This happens because with large beam sizes, the model prefers translations that are too short. This phenomenon has been linked to the local normalization in sequence models and poor model calibration. It has been shown that modes are often empty and suggested that the inherent bias of the model towards short translations is often obscured by beam search errors. This length deficiency may be due to the intrinsic uncertainty of the MT task.

Given that models trained with SCONES explicitly take into account inherent uncertainty, an experiment was conducted to determine whether these models are more robust to the beam search curse compared to softmax trained models. FIG. 8 plots the BLEU score as a function of the beam size. The sharp decline of the softmax curve 802 for large beam sizes reflects the beam search curse for the softmax baseline. The results indicate that SCONES can be less affected at larger beam sizes, particularly for small $\alpha$-values: the BLEU score for SCONES with $\alpha=0:2$ (line 804) is stable for beam sizes greater than 100.

Figure 9B:
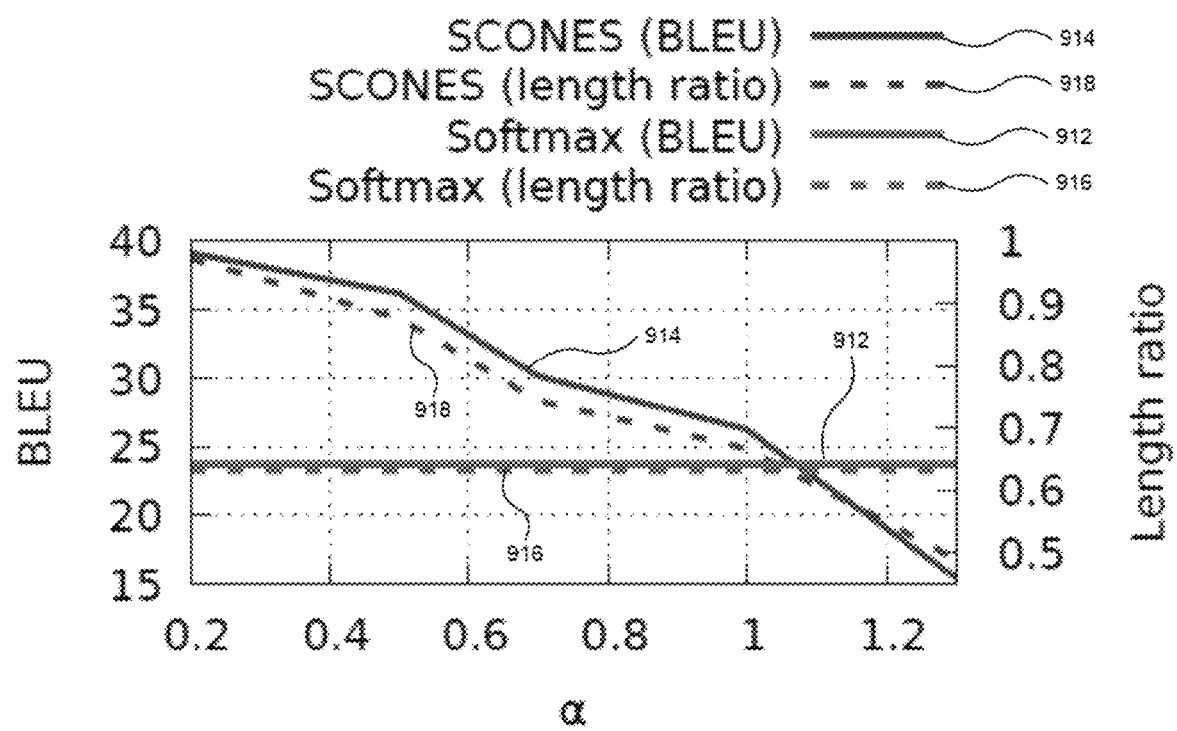

FIG. 9A, which displays the length ratio (the hypothesis length divided by the reference length) versus beam size for a German-English evaluation, suggests that the differences in BLEU trajectories arise due to translation lengths. Translations obtained using softmax (902) become abruptly shorter at higher beam sizes whereas for SCONES with $\alpha=0:2$ (904), there is no such steep decrease in length. To study the impact of $\alpha$ in the absence of beam search errors the exact depth-first search algorithm of Stahlberg and Byrne ("On NMT search errors and model errors: Cat got your tongue?", 2019, in Proceedings of the 2019 Conference on Empirical Methods in Natural Language Processing and the 9th International Joint Conference on Natural Language Processing (EMNLP-IJCNLP), pages 3356-636 3362, the entire disclosure of which is incorporated herein by reference) was run to find the translation with global 309 highest probability. The adequacy of the translations found by exact search depends heavily on a, which is shown in the plot of FIG. 9B of German-English BLEU scores (softmax: 912; SCONES: 914) and length ratios (softmax 916; SCONES 918).

Figure 10C:
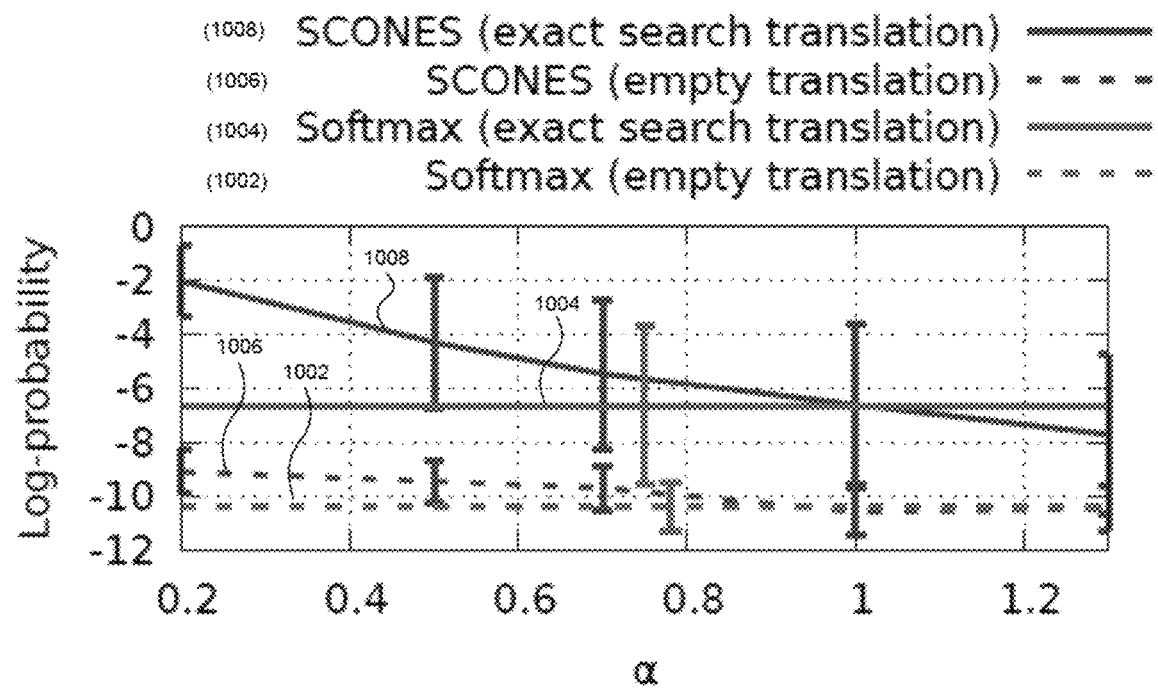
FIG. 10C illustrates mean and standard deviation of log-probabilities of the global highest probability translations search in accordance with aspects of the technology.

With exact search, small $\alpha$-values yield adequate translations, but $\alpha\sim1:0$ performs similar to the softmax baseline: the BLEU score drops because hypotheses are too short. Tables 1000 and 1020 in FIGS. 10A-B, respectively, show that SCONES with $\alpha=0:2$ consistently outperforms the softmax baselines by a large margin with exact search. FIG. 10C, which illustrates mean and standard deviation (error bars) of log-probabilities of the global highest probability translations (found using exact search) and the empty translations for German-English, sheds some light on why SCONES with small a does not prefer empty translations. Here, 1002 shows a softmax empty translation, 1004 shows a softmax exact search translation, 1006 shows a SCONES empty translation, and 1008 shows a SCONES exact search translation.

A small α leads to a larger gap between the log-probabilities of the exact search translation and the empty translation that arises from higher log-probabilities for the exact-search translation along with smaller variances. Intuitively, a small a reduces the importance of the negative loss component ($\mathcal{L}\_(\cdot)$) in the above-identified $\mathcal{L}_{SCONES}(x, y, i)$ equation, and thus biases each binary classifier towards predicting the true label.

Figure 11:
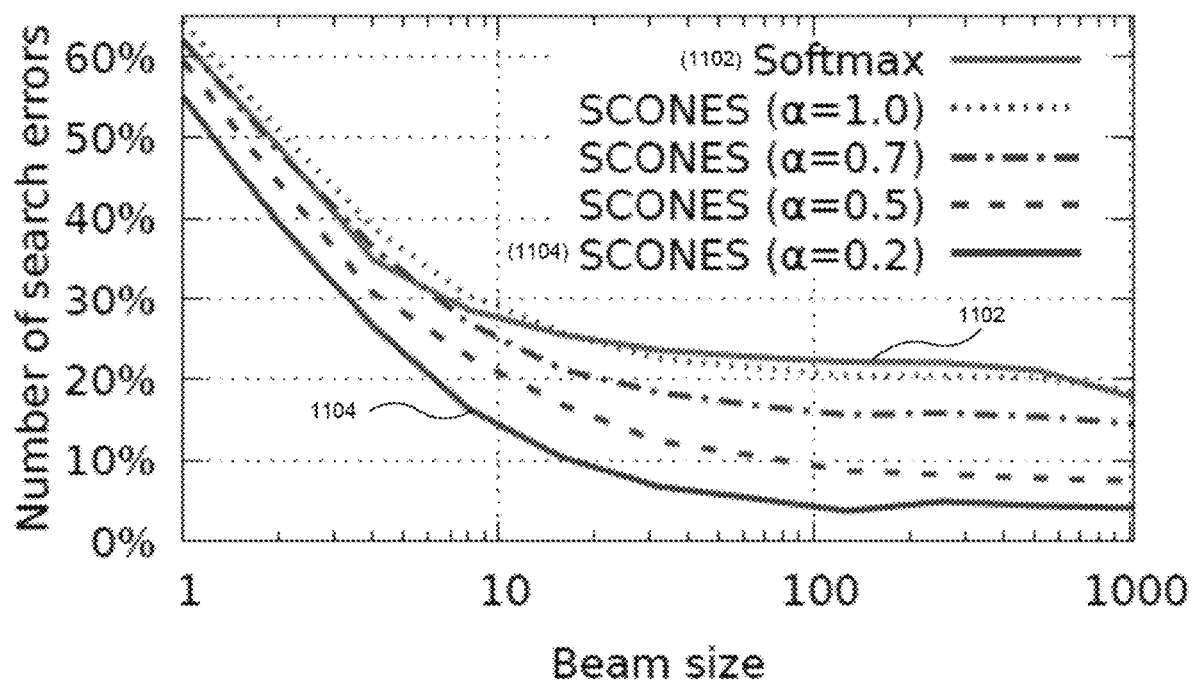
FIG. 11 illustrates the percentage of beam search errors for different test criteria in accordance with aspects of the technology.

FIG. 11 displays the percentage of beam search errors (for a German-English example), in particular the fraction of sentences for which beam search did not find the global best translation, as a function of beam size. Here, 1102 is the softmax plot and 1104 is the SCONES plot for α=0.2. These test results confirms the findings of Stahlberg and Byrne for softmax models, in particular that the percentage of search errors remains at a relatively high level of around 20% even for very large beam sizes. Increasing the beam size is most effective in reducing the number of search errors for SCONES with a small value of α. However, a small a does not always yield the best overall BLEU score (see FIG. 8). Taken together, these observations provide an insight into model errors in NMT: If one were to describe the "model error" as the mismatch between the global most likely translation and an adequate translation, then a small a would simultaneously lead to both fewer search errors (see FIG. 11) and fewer model errors (see tables 1000 and 1020 of FIGS. 10A-B). Counterintuitively, however, BLEU scores peak at slightly higher α-values (see table 4 in FIG. 6).

Experiments with Synthetic Language Pairs

A key motivation for SCONES is to equip the model to naturally represent intrinsic uncertainty, i.e., the existence of multiple correct target sentences for the same source sentence. To examine the characteristics of SCONES as a function of uncertainty, synthetic language pairs were generated that differ by the level of ambiguity. For this purpose, an IBM-3 model was trained on German-English training data after subword segmentation using MGIZA. MGIZA is described in "Parallel implementations of word alignment tool" by Gao and Vogel in Software Engineering, Testing, and Quality Assurance for Natural Language Processing", pages 49-57, 2008, the entire disclosure of which is incorporated by reference herein. IBM-3 is a generative symbolic model that describes the translation process from one language into another with a generative story, and has been used to find word alignments for statistical (phrase-based) machine translation.

The generative story includes different steps such as distortion (word reordering), fertility (1:n word mappings), and lexical translation (word-to-word translation) that describe the translation process. The parameters of IBM-3 define probability distributions for each step. In the experiments, IBM-3 was not used for finding word alignments. Instead, for the original German sentences synthetic English-like translations were sampled from the model with different sampling temperatures to control the ambiguity levels of the translation task. A low sampling temperature generates sentence pairs that still capture some of the characteristics of MT such as word reorderings, but the mapping is mostly deterministic (i.e., the same source token is almost always translated to the same target token). A high temperature corresponds to more randomness, which is to say more intrinsic uncertainty. NMT models may be trained using either softmax or SCONES on the synthetic corpora.

The tables in FIGS. 12A-B contains more details about sampling from IBM-3. The parameters of the IBM-3 model are composed of a set of fertility probabilities $n(\cdot|\cdot)$, $p_0$, $p_1$, a set of translation probabilities $t(\cdot|\cdot)$, and a set of distortion probabilities $d(\cdot|\cdot)$. According to the IBM Model 3, the following generative process produces the target language sentence y from a source language sentence x:

1. For each source word $x_i$ indexed by i=1, 2, ..., |x|, choose the fertility $\phi_i$ with probability $n(\phi_i|x_i)$.
2. Choose the number $\phi_0$ of "spurious" target words to be generated from $x_0$=NULL, using probability $p_1$ and the sum of fertilities from step 1.
3. Let $m=\Sigma_{i=0}^{|x|}\phi_i$.
4. For each i=0, 1, 2, ..., |x| and each k=1, 2, ..., $\phi_i$, choose a target word $\tau_{ik}$ with probability $t(\tau_{ik}|x_i)$.
5. For each i=1, 2, ..., |x| and each k=1, 2, ..., $\phi_i$, choose a target position $\tau_{ik}$ with probability $d(\pi_{ik}|i, [x], m)$.
6. For each k=1, 2, ..., $\phi_0$, choose a position $\pi_{0k}$ from the $\phi_0$-k+1 remaining vacant positions in 1, 2, ..., m, for a total probability of $$\frac{1}{\phi_0!}.$$

7. Output the target sentence with words $\tau_{ik}$ in positions $\pi_{ik}$ (0≤i≤|x|, 1k≤$\phi_i$).

The IBM-3 model parameters may be first estimated using the MGIZA word alignment tool. Then, English-like target sentences are sampled for the German source sentences following the generative story above. To control the level of uncertainty in the synthetic translation task, the entropies of the $n(\cdot|\cdot)$, $t(\cdot|\cdot)$, and $d(\cdot|\cdot)$, distributions are obtained by choosing different sampling temperatures y∈ $\mathbb{R}$ $^+$.

Instead of sampling directly from a categorical distribution $P(\cdot)$ over categories C, temperature sampling uses the following distribution for each c∈C:

$$P_\gamma(c) = \frac{e^{\log P(c)/\gamma}}{\sum_{c' \in C} e^{\log P(c')/\gamma}}$$

A low temperature amplifies large differences in probabilities, and thus leads to a lower entropy and less ambiguity.

Figure 13A:
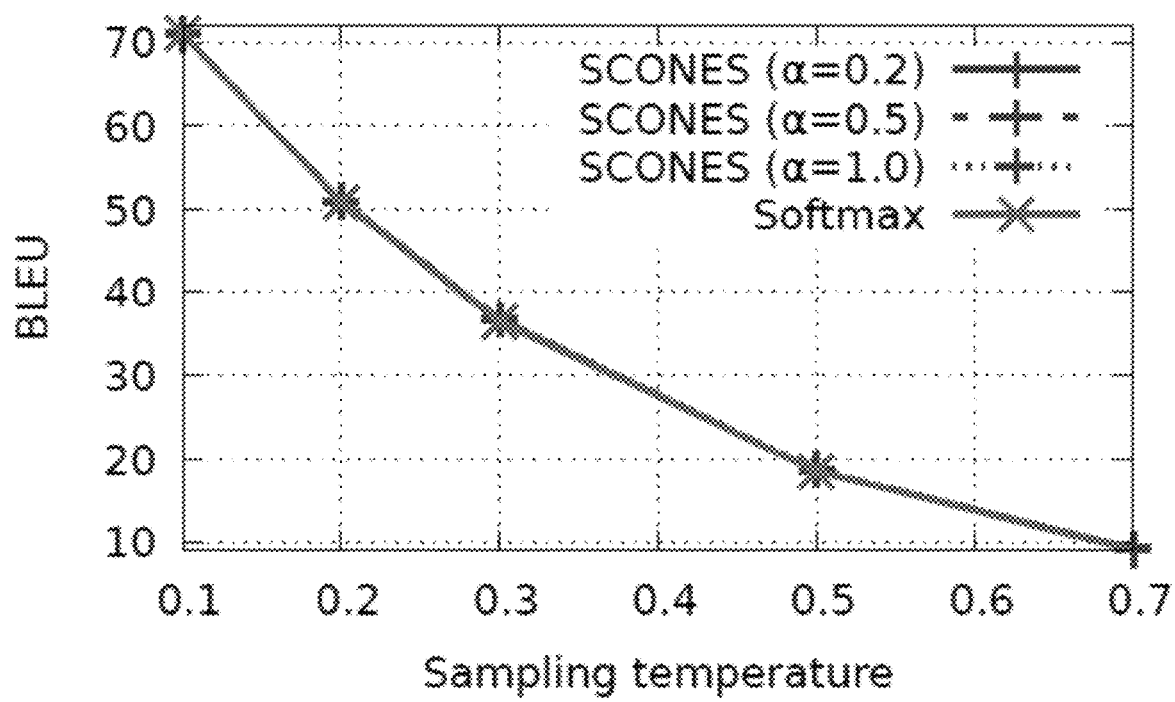
FIGS. 13A-B present plot of BLEU scores with different sampling temperatures in accordance with aspects of the technology.
Figure 13B:
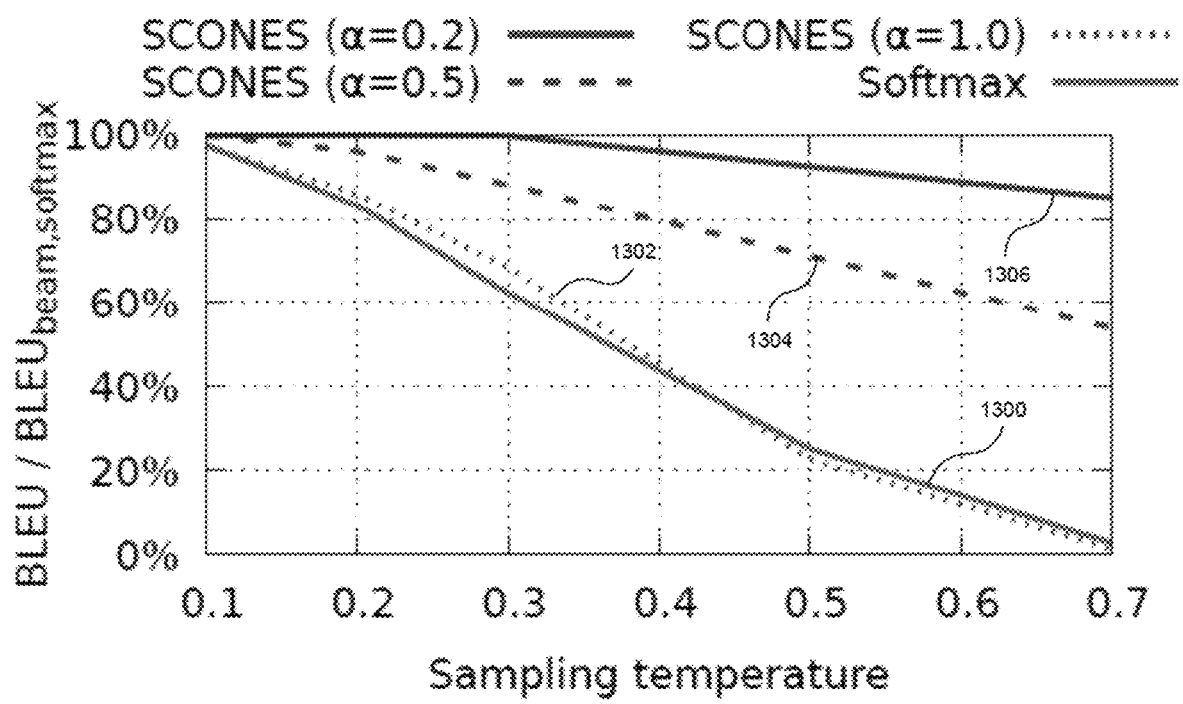

FIG. 13A presents a plot of BLEU scores with beam search (beam size of 4) for German-to-synthetic-English translation with different IBM-3 sampling temperatures. This plot shows that softmax and SCONES perform similarly using beam search. High IBM-3 sampling temperature translation tasks are less predictable, and thus lead to lower BLEU scores. The difference between both approaches becomes clear with exact search as shown in the plot of FIG. 13B. While the translations with the global highest probability for high IBM-3 sampling temperatures are heavily degraded for softmax (1300) and SCONES with α=1 (1302), the drop is much less dramatic for SCONES with either α=0.5 (1304) or α=0.2 (1306). Setting α to a low value enables the model to assign its highest probability to adequate translations, even when the translation task is highly uncertain. This scaling factor is adjustable, for instance to maximize translation performance SCONES has one more parameter (α) than softmax that trades off positive and negative examples. This enables SCONES to achieve enhanced performance as shown in the above test results. FIG. 14 provides an example implementation of SCONES written in JAX.

Example Computing Architecture

Figure 15A:
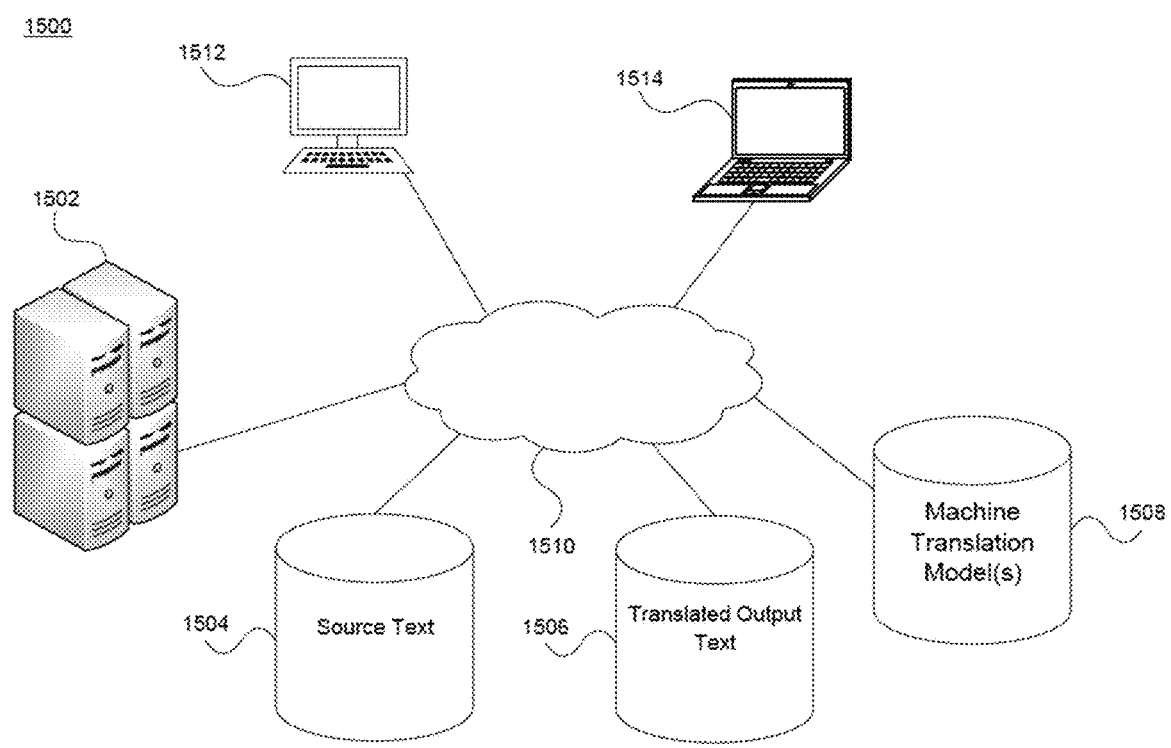
FIGS. 15A-B illustrate a system for use with aspects of the technology.
Figure 15B:
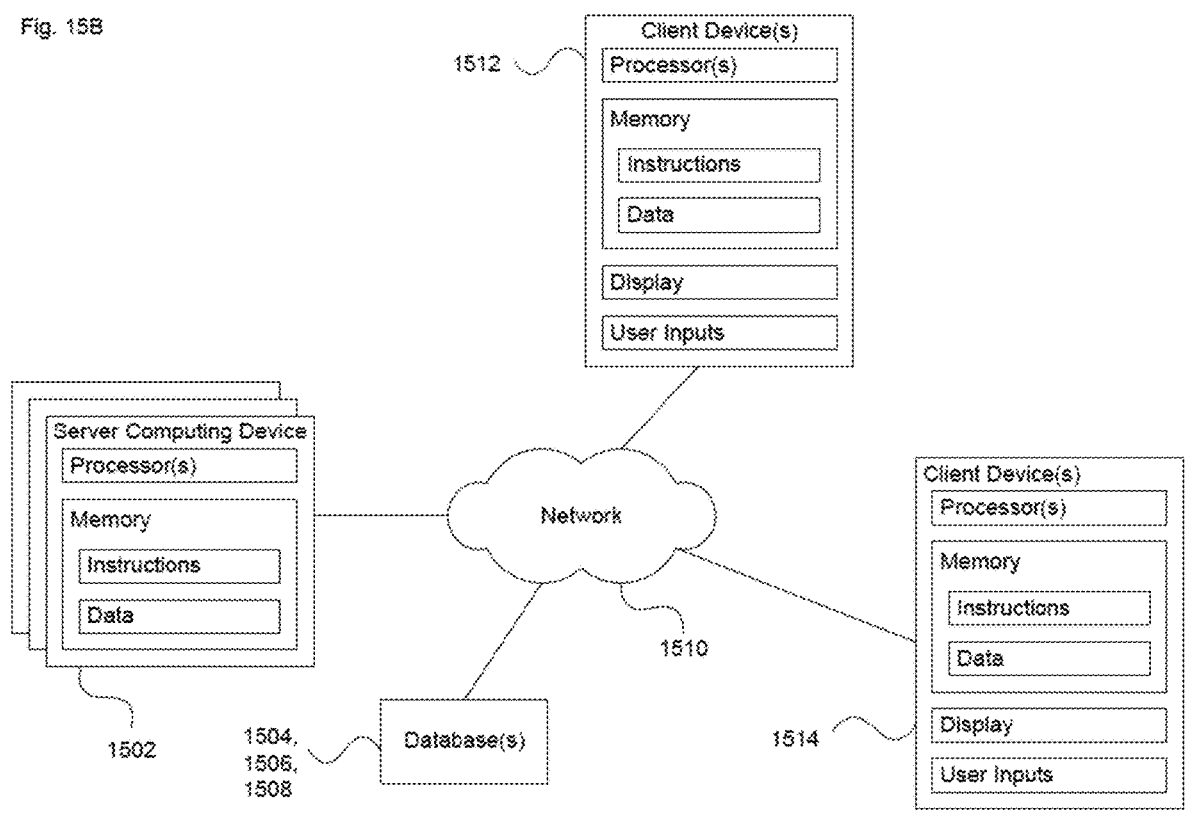

The models discussed herein may be trained on one or more tensor processing units (TPUs), CPUs or other computing architectures in order to model ambiguity using SCONES in accordance with the features disclosed herein. One example computing architecture is shown in FIGS. 15A and 15B. In particular, FIGS. 15A and 15B are pictorial and functional diagrams, respectively, of an example system 1500 that includes a plurality of computing devices and databases connected via a network. For instance, computing device(s) 1502 may be implemented as a cloud-based server system. Databases 1504, 1506 and 1508 may store, e.g., the original source texts (e.g., one or more sets of exemplar source text sentences or other groups of text), translated output texts (e.g., one or more sets of target sentences or other target groups of text) and/or machine translation models, respectively. The server system may access the databases via network 1510. Client devices may include one or more of a desktop computer 1512 and a laptop or tablet PC 1514, for instance to provide the original text or other content, and/or to view the output (e.g., selected translations or use of the assessment or other information in a translation service, app or other program).

As shown in FIG. 15B, each of the computing devices 1502 and 1512-1514 may include one or more processors, memory, data and instructions. The memory stores information accessible by the one or more processors, including instructions and data (e.g., models) that may be executed or otherwise used by the processor(s). The memory may be of any type capable of storing information accessible by the processor(s), including a computing device-readable medium. The memory is a non-transitory medium such as a hard-drive, memory card, optical disk, solid-state, etc. Systems may include different combinations of the foregoing, whereby different portions of the instructions and data are stored on different types of media. The instructions may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance.

The processors may be any conventional processors, such as commercially available CPUs, TPUs, graphical processing units (GPUs), etc. Alternatively, each processor may be a dedicated device such as an ASIC or other hardware-based processor. Although FIG. 15B functionally illustrates the processors, memory, and other elements of a given computing device as being within the same block, such devices may actually include multiple processors, computing devices, or memories that may or may not be stored within the same physical housing. Similarly, the memory may be a hard drive or other storage media located in a housing different from that of the processor(s), for instance in a cloud computing system of server 1502. Accordingly, references to a processor or computing device will be understood to include references to a collection of processors or computing devices or memories that may or may not operate in parallel.

The input data, such as one or more sentences or sets of textual content, may be operated on by a SCONES-trained model to generate one or more translations, text quality assessment data, etc. The client devices may utilize such information in various apps or other programs to perform translations, dialog modeling, spelling or grammatic error corrections, quality assessment or other metric analysis, recommendations, classification, search, etc. This could include assigning quality scores to different translations based upon the results of the processing. Therefore, quality scores can be used to rank translations and prioritize good translations in serving, such as for a video streaming service with subtitles.

The computing devices may include all of the components normally used in connection with a computing device such as the processor and memory described above as well as a user interface subsystem for receiving input from a user and presenting information to the user (e.g., text, imagery and/or other graphical elements). The user interface subsystem may include one or more user inputs (e.g., at least one front (user) facing camera, a mouse, keyboard, touch screen and/or microphone) and one or more display devices (e.g., a monitor having a screen or any other electrical device that is operable to display information (e.g., text, imagery and/or other graphical elements). Other output devices, such as speaker(s) may also provide information to users.

The user-related computing devices (e.g., 1512-1514) may communicate with a back-end computing system (e.g., server 1502) via one or more networks, such as network 1510. The network 1510, and intervening nodes, may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 1502 may include one or more server computing devices having a plurality of computing devices, e.g., a load balanced server farm or cloud computing system, that exchange information with different nodes of a network for the purpose of receiving, processing and transmitting the data to and from other computing devices. For instance, computing device 1502 may include one or more server computing devices that are capable of communicating with any of the computing devices 1512-1514 via the network 1510.

Model information or other data derived from the SCONES approach may be shared by the server with one or more of the client computing devices. Alternatively or additionally, the client device(s) may maintain their own databases, models, etc.

Figure 16:
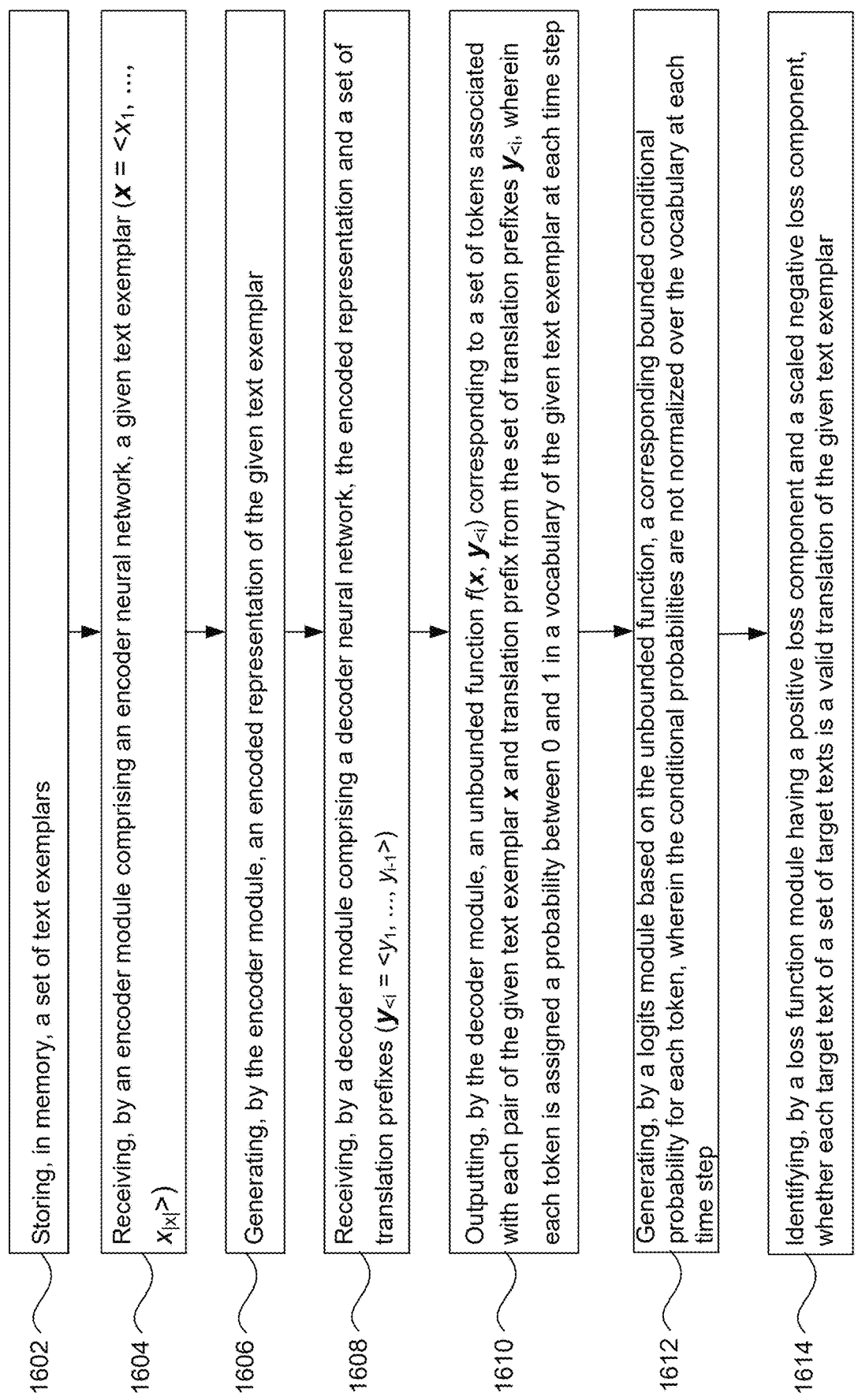
FIG. 16 illustrates a method in accordance with aspects of the technology.

FIG. 16 illustrates a method 1600 for addressing ambiguity in neural machine translation in accordance with aspects of the technology. At block 1602 a set of text exemplars is stored in memory. At block 1604, an encoder module comprising an encoder neural network receives a given text exemplar ($x = <x_1, \ldots, x_{|x|}>$). At block 1606 the encoder module generates an encoded representation of the given text exemplar. At block 1608, a decoder module receives the encoded representation and a set of translation prefixes ($y_{<i} = <y_1, \ldots, y_{i-1}>$). At block 1610, the decoder module outputs an unbounded function $f(x, y_{<i})$ corresponding to a set of tokens associated with each pair of the given text exemplar x and translation prefix from the set of translation prefixes $y_{<i}$, wherein each token is assigned a probability between 0 and 1 in a vocabulary of the given text exemplar at each time step. At block 1612, a logits module generates, based on the unbounded function, a corresponding bounded conditional probability for each token, wherein the conditional probabilities are not normalized over the vocabulary at each time step. And at block 1614, a loss function module having a positive loss component and a scaled negative loss component identifies whether each target text of a set of target texts is a valid translation of the given text exemplar.

Machine translation is a task with high intrinsic uncertainty: a source sentence can have multiple valid translations. It has been demonstrated that NMT models and specifically Transformers, can learn to model mutually non-exclusive target sentences from single-label training data using the SCONES loss function. Rather than learn a single distribution over all target sentences, SCONES learns multiple binary classifiers that indicate whether or not a target sentence is a valid translation of the source sentence. SCONES yields improved translation quality over conventional softmax-based models for six different translation directions, or (alternatively) speed-ups of up to 3.9× without any degradation in translation performance.

It has been demonstrated that SCONES can be tuned to mitigate the beam search curse and the problem of inadequate and empty modes in standard NMT. Experiments on synthetic language translation suggest that, unlike softmax-trained models, SCONES models are able to assign their highest probability to adequate translations even when the underlying task is highly ambiguous.

The SCONES loss function is easy to implement. Adapting standard softmax-based sequence-to-sequence architectures such as Transformers requires only replacing the cross-entropy loss function with SCONES and the softmax with sigmoid activations. The remaining parts of the training and inference pipelines can be kept unchanged. SCONES can be useful in handling uncertainty for a variety of ambiguous NLP problems beyond translation, such as generation and dialog.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A system configured for a machine translation model, the system comprising:
   memory configured to store a set of text exemplars in a source language and a set of rewritten texts in one or more languages different from the source language; and
   one or more processing elements operatively coupled to the memory, the one or more processing elements implementing the machine translation model as a neural network having:
   an encoder module comprising an encoder neural network configured to receive a given text exemplar ($x = <x1, \ldots x_{|x|}>$) and to generate an encoded representation of the given text exemplar:
   a decoder module comprising a decoder neural network configured to receive the encoded representation and a set of translation prefixes ($y_{<i} = <y1, \ldots, y_{i-1}>$) and to output an unbounded function $f(x, y_{<i})$ corresponding to a set of tokens associated with each pair of the given text exemplar x and translation prefix from the set of translation prefixes ye, wherein each token is assigned a probability between 0 and 1 in a vocabulary of the given text exemplar at each time step:
   a logits module configured to act on the unbounded function to generate a corresponding bounded conditional probability for each token, wherein the conditional probabilities are not normalized over the vocabulary at each time step; and
   a loss function module having a positive loss component and a scaled negative loss component, in which the loss function module is configured to identify whether each target text of a set of target texts is a valid translation of the given text exemplar.

2. The system of claim 1, wherein the set of text exemplars comprises a set of input sentences, and the system is configured to learn binary classifiers for each sentence pair (x,y) that indicate whether or not y is a valid translation of x.

3. The system of claim 2, wherein intrinsic uncertainty is represented by setting the conditional probabilities of at least two correct translations $y_1$ and $y_2$ to a maximum probability simultaneously.

4. The system of claim 2, wherein the logits module is configured to generate probabilities for each translation using separate binary classifiers.

5. The system of claim 1, wherein a probability of a complete translation of the given text exemplar is decomposed into a product of token-level probabilities.

6. The system of claim 1, wherein the logits module is configured to apply sigmoid activations to the unbounded function at each time step.

7. The system of claim 1, wherein the positive loss component applies a log function to the bounded conditional probability for each reference token, and the scaled negative loss component applies a log function to the bounded conditional probability for each non-reference token.

8. The system of claim 1, wherein during inference the system is configured to search for a translation that has a highest probability of being a translation of a text segment to be translated.

9. The system of claim 1, wherein the system is configured to express intrinsic uncertainty associated with the machine translation model.

10. The system of claim 1, wherein the loss function module is configured to adjust scaling of the negative loss component to maximize translation performance.

11. The system of claim 1, wherein the encoder module and the decoder module comprise a self-attention neural network encoder-decoder architecture.

12. The system of claim 1, wherein the encoder module and the decoder module comprise a sequence to sequence model architecture.

13. A machine translation method employing a neural network, the method comprising:
   storing, in a memory, a set of text exemplars:
   receiving, by an encoder module comprising an encoder neural network, a given text exemplar ($x = <x1, \ldots, x_{|x|}>$):
   generating, by the encoder module, an encoded representation of the given text exemplar:
   receiving, by a decoder module, the encoded representation and a set of translation prefixes ($y_{<i} = <y1, \ldots, y_{i-1}>$):
   outputting, by the decoder module, an unbounded function $f(x, y_{<i})$ corresponding to a set of tokens associated with each pair of the given text exemplar x and translation prefix from the set of translation prefixes $y_{<i}$, wherein each token is assigned a probability between 0 and 1 in a vocabulary of the given text exemplar at each time step:

generating, by a logits module based on the unbounded function, a corresponding bounded conditional probability for each token, wherein the conditional probabilities are not normalized over the vocabulary at each time step; and identifying, by a loss function module having a positive loss component and a scaled negative loss component, whether each target text of a set of target texts is a valid translation of the given text exemplar.

14. The method of claim 13, wherein the set of text exemplars comprises a set of input sentences, and the method includes learning binary classifiers for each sentence pair (x,y) that indicate whether or not y is a valid translation of x.

15. The method of claim 14, wherein intrinsic uncertainty is represented by setting the conditional probabilities of at least two correct translations $y_1$ and $y_2$ to a maximum probability simultaneously.

16. The method of claim 14, wherein generating the corresponding bounded conditional probability for each token comprises generating probabilities for each translation using separate binary classifiers.

17. The method of claim 13, wherein a probability of a complete translation of the given text exemplar is decomposed into a product of token-level probabilities.

18. The method of claim 13, wherein generating the corresponding bounded conditional probability for each token comprises applying sigmoid activations to the unbounded function at each time step.

19. The method of claim 13, wherein the positive loss component applies a log function to the bounded conditional probability for each token, and the scaled negative loss component applies a log function to the bounded conditional probability for each token.

20. The method of claim 13, further comprising, during inference searching for a translation that has a highest probability of being a translation of a text segment to be translated.

21. The method of claim 13, further comprising adjusting scaling of the negative loss component to maximize translation performance.

* * * * *